United States Patent
Miller et al.

(10) Patent No.: US 9,118,974 B2
(45) Date of Patent: *Aug. 25, 2015

(54) SATELLITE TELEVISION ANTENNA SYSTEM

(71) Applicant: Electronic Controlled Systems, Inc., Bloomington, MN (US)

(72) Inventors: Craig Miller, Minneapolis, MN (US); Sam Shuster, Minneapolis, MN (US)

(73) Assignee: Electronic Controlled Systems, Inc., Bloomington, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/336,708

(22) Filed: Jul. 21, 2014

(65) Prior Publication Data

US 2015/0026737 A1    Jan. 22, 2015

Related U.S. Application Data

(63) Continuation of application No. 13/680,042, filed on Nov. 17, 2012, now Pat. No. 8,789,116.

(60) Provisional application No. 61/561,820, filed on Nov. 18, 2011.

(51) Int. Cl.
*H01Q 3/08* (2006.01)
*H04N 21/61* (2011.01)
(Continued)

(52) U.S. Cl.
CPC ......... *H04N 21/6143* (2013.01); *H01Q 1/1257* (2013.01); *H01Q 3/08* (2013.01); *H04N 21/426* (2013.01); *H01Q 1/42* (2013.01); *H01Q 19/19* (2013.01)

(58) Field of Classification Search
CPC ......... H01Q 1/1257; H01Q 1/40; H01Q 2/02; H01Q 19/19; H04N 21/6143; H04N 21/426
USPC .............................. 725/72; 343/761, 839, 872
See application file for complete search history.

(56) References Cited

U.S. PATENT DOCUMENTS 2,814,038 A    11/1957   Miller
3,071,338 A    1/1963    Kaufman et al.
(Continued)

FOREIGN PATENT DOCUMENTS

FR    2589633 A1    5/1987
GB    2 272 575 A    5/1994
(Continued)

OTHER PUBLICATIONS

SAT-GO Owners Manual, DIRECTV, Inc., 2007, 65 pages.
(Continued)

*Primary Examiner* — Nasser Goodarzi
*Assistant Examiner* — Michael B Pierorazio
(74) *Attorney, Agent, or Firm* — Skaar Ulbrich Macari, P.A.

(57) ABSTRACT

The satellite television antenna device scans the sky and locks onto a first satellite candidate by measuring microwave radiation. The antenna acquires identification (ID) of a first satellite candidate from a set top box (STB), if possible. Then, the antenna moves to a second satellite candidate and acquires the corresponding ID from the STB, if possible. Antenna dish orientation information is stored in memory for at least all satellites that were identified as corresponding to a user's television programming package. The antenna can switch directly between two or more stored dish positions in response to the user changing channels on the STB. The antenna can be powered solely by the STB. A two-way communication conduit can be established between the STB and the antenna via a single cable. The communications conduit can also be used to transmit power to the antenna.

20 Claims, 16 Drawing Sheets

(51) Int. Cl.
*H01Q 1/12* (2006.01)
*H04N 21/426* (2011.01)
*H01Q 1/42* (2006.01)
*H01Q 19/19* (2006.01)

(56) References Cited

U.S. PATENT DOCUMENTS

| | | | |
|---|---|---|---|
| 3,388,401 A | 6/1968 | Weir | |
| 3,599,218 A | 8/1971 | Williamson et al. | |
| 3,781,898 A | 12/1973 | Holloway et al. | |
| 3,918,065 A | 11/1975 | Hutchison et al. | |
| 4,096,481 A | 6/1978 | Widmer et al. | |
| 4,169,226 A | 9/1979 | Fukuji | |
| 4,190,839 A | 2/1980 | Liautaud | |
| 4,282,530 A | 8/1981 | Semplak | |
| 4,309,708 A | 1/1982 | Sayovitz | |
| 4,649,675 A | 3/1987 | Moldovan et al. | |
| 4,654,670 A | 3/1987 | Fleming | |
| 4,771,293 A | 9/1988 | Williams et al. | |
| 4,804,972 A | 2/1989 | Schudel | |
| 4,868,575 A | 9/1989 | Mok et al. | |
| 4,918,459 A | 4/1990 | De Teso | |
| 4,939,524 A | 7/1990 | Blaese | |
| 4,946,736 A | 8/1990 | Sassa | |
| 4,998,114 A | 3/1991 | Eto et al. | |
| 5,019,833 A | 5/1991 | Nonaka | |
| 5,088,680 A | 2/1992 | Farmer | |
| 5,218,369 A | 6/1993 | Jennings | |
| 5,262,793 A | 11/1993 | Sperry | |
| 5,274,382 A | 12/1993 | Wills et al. | |
| 5,296,862 A | 3/1994 | Rodeffer et al. | |
| 5,309,162 A | 5/1994 | Uematsu et al. | |
| 5,337,062 A | 8/1994 | Sherwood et al. | |
| 5,347,286 A | 9/1994 | Babitch | |
| 5,418,542 A | 5/1995 | Sherwood et al. | |
| 5,419,521 A | 5/1995 | Matthews | |
| 5,451,972 A | 9/1995 | Franklin | |
| 5,471,219 A | 11/1995 | Rodeffer et al. | |
| 5,515,065 A | 5/1996 | Sherwood et al. | |
| 5,528,253 A | 6/1996 | Franklin | |
| 5,543,814 A | 8/1996 | Jenness, Jr. | |
| 5,585,804 A | 12/1996 | Rodeffer | |
| 5,604,508 A | 2/1997 | Atkinson | |
| 5,606,334 A | 2/1997 | Amarillas et al. | |
| 5,610,620 A | 3/1997 | Stites et al. | |
| 5,619,215 A | 4/1997 | Sydor | |
| 5,646,638 A | 7/1997 | Winegard et al. | |
| 5,675,348 A | 10/1997 | Okada et al. | |
| 5,689,276 A | 11/1997 | Uematsu et al. | |
| 5,714,963 A | 2/1998 | Cox | |
| 5,729,241 A | 3/1998 | Ergen et al. | |
| 5,760,751 A | 6/1998 | Gipson | |
| 5,815,125 A | 9/1998 | Kelly et al. | |
| 5,819,185 A | 10/1998 | Umezawa et al. | |
| 5,877,730 A | 3/1999 | Foster | |
| 5,892,488 A | 4/1999 | Dulon | |
| 5,929,818 A | 7/1999 | Snyder | |
| 5,933,123 A | 8/1999 | Kaul | |
| 5,949,386 A | 9/1999 | Elliott | |
| 5,983,071 A | 11/1999 | Gagnon et al. | |
| 5,999,137 A | 12/1999 | Crosby | |
| 6,023,245 A | 2/2000 | Gomez et al. | |
| 6,067,051 A | 5/2000 | Terk et al. | |
| 6,072,440 A | 6/2000 | Bowman | |
| 6,087,985 A | 7/2000 | Rümmeli et al. | |
| 6,104,353 A | 8/2000 | Diamond et al. | |
| 6,127,982 A | 10/2000 | Terk | |
| 6,166,703 A | 12/2000 | Muterspaugh | |
| 6,175,171 B1 | 1/2001 | Rupp et al. | |
| 6,181,286 B1 | 1/2001 | Roscoe et al. | |
| 6,188,367 B1 | 2/2001 | Morrison et al. | |
| 6,191,752 B1 | 2/2001 | Lester et al. | |
| 6,191,753 B1 | 2/2001 | Ellis et al. | |
| 6,191,820 B1 | 2/2001 | Kang et al. | |
| 6,204,820 B1 | 3/2001 | Jensen, Jr. | |
| 6,266,017 B1 | 7/2001 | Aldous | |
| 6,281,852 B1 | 8/2001 | Amarillas | |
| 6,292,155 B1 | 9/2001 | McPhilmy et al. | |
| 6,329,954 B1 | 12/2001 | Fuchs et al. | |
| 6,366,252 B1 | 4/2002 | Terk | |
| 6,519,446 B2 | 2/2003 | Tawil et al. | |
| 6,538,612 B1 | 3/2003 | King | |
| 6,682,029 B1 | 1/2004 | Dierkes | |
| 6,693,587 B1 | 2/2004 | Kuether et al. | |
| 6,710,749 B2 | 3/2004 | King | |
| 6,710,794 B1 | 3/2004 | Yamazaki et al. | |
| 6,714,167 B1 | 3/2004 | Gusick, Jr. | |
| 6,762,727 B2 | 7/2004 | Rochford et al. | |
| 6,832,070 B1 | 12/2004 | Perry et al. | |
| 6,844,855 B2 | 1/2005 | Carson | |
| 6,864,846 B2 | 3/2005 | King | |
| 6,904,609 B1 | 6/2005 | Pietraszak et al. | |
| 6,937,199 B2 | 8/2005 | King | |
| 7,075,492 B1 | 7/2006 | Chen et al. | |
| 7,076,202 B1 | 7/2006 | Billmaier | |
| 7,227,506 B1 | 6/2007 | Lewis, Jr. | |
| 7,230,581 B2 | 6/2007 | McEwan | |
| 7,239,274 B2 | 7/2007 | Lee et al. | |
| 7,268,734 B2 | 9/2007 | Cislo | |
| 7,301,505 B2 | 11/2007 | King | |
| 7,317,366 B1 | 1/2008 | Duer | |
| 7,372,428 B1 | 5/2008 | King | |
| 7,472,409 B1 | 12/2008 | Linton | |
| 7,477,203 B2 | 1/2009 | Park | |
| 7,484,233 B2 | 1/2009 | Pietraszak et al. | |
| 7,603,687 B2 | 10/2009 | Pietraszak et al. | |
| 7,679,573 B2 | 3/2010 | Shuster et al. | |
| 8,077,113 B2 | 12/2011 | Syed et al. | |
| 8,269,901 B2 | 9/2012 | Yi et al. | |
| 8,368,611 B2 | 2/2013 | King et al. | |
| 2003/0051246 A1 | 3/2003 | Wilder et al. | |
| 2003/0214449 A1 | 11/2003 | King | |
| 2004/0080461 A1 | 4/2004 | Rothgeb et al. | |
| 2004/0128689 A1 | 7/2004 | Pugel et al. | |
| 2004/0160375 A1* | 8/2004 | King | 343/757 |
| 2004/0227655 A1 | 11/2004 | King | |
| 2005/0108751 A1 | 5/2005 | Dacosta | |
| 2005/0193415 A1 | 9/2005 | Ikeda | |
| 2005/0225495 A1 | 10/2005 | King | |
| 2006/0020978 A1 | 1/2006 | Miyagawa | |
| 2006/0139499 A1 | 6/2006 | Onomatsu et al. | |
| 2006/0170603 A1 | 8/2006 | King | |
| 2007/0007402 A1 | 1/2007 | Dierkes | |
| 2007/0152897 A1 | 7/2007 | Zimmerman et al. | |
| 2007/0252765 A1 | 11/2007 | Jayasuriya et al. | |
| 2008/0129885 A1 | 6/2008 | Yi et al. | |
| 2008/0136722 A1 | 6/2008 | King | |
| 2008/0186242 A1 | 8/2008 | Shuster et al. | |
| 2008/0186409 A1 | 8/2008 | Kang et al. | |
| 2008/0246677 A1* | 10/2008 | Shuster et al. | 343/766 |
| 2009/0040130 A1 | 2/2009 | Conrad | |
| 2009/0085825 A1 | 4/2009 | Conrad | |
| 2009/0085826 A1 | 4/2009 | Conrad | |
| 2009/0135309 A1 | 5/2009 | DeGeorge et al. | |
| 2009/0260038 A1 | 10/2009 | Acton et al. | |
| 2009/0262033 A1 | 10/2009 | King et al. | |
| 2009/0310030 A1 | 12/2009 | Litwin et al. | |
| 2010/0214482 A1 | 8/2010 | Kang | |
| 2010/0315307 A1 | 12/2010 | Syed et al. | |
| 2011/0126232 A1 | 5/2011 | Lee et al. | |
| 2013/0207868 A1 | 8/2013 | Venghaus et al. | |

FOREIGN PATENT DOCUMENTS

| | | |
|---|---|---|
| JP | 11346168 (A) | 12/1999 |
| JP | 2005-203978 A | 7/2005 |
| WO | WO 02/103841 A1 | 12/2002 |
| WO | WO 2008-030041 A1 | 3/2008 |

(56) References Cited

FOREIGN PATENT DOCUMENTS

| WO | WO 2008/098121 A1 | 8/2008 |
|---|---|---|
| WO | WO 2009-061014 A1 | 5/2009 |

OTHER PUBLICATIONS

KVH Industries, Inc., A Guide to TracVision LM, 1999, 49 pages.
KVH Industries, Inc., A Guide to TracVision L3/S3—Owner's Manual, 2003, 77 pages.
KVH Industries, Inc., A Guide to TracVision G4—Owner's Manual, 1999, 133 pages.
KVH Industries, Inc., A Guide to TracVision R4/R5—Owner's Manual, 2005, 66 pages.
KVH Industries, Inc., TracVision 45 manual, 1998, 47 pages.
Datron/Transco Inc. brochure, Product Information sheet for DBS-3000 Mobile Satellite Television System, Dec. 1996, 2 pages.
Datron/Transco Inc. Installation Instructions for DBS-30500 Mobile Satellite Television System, 1999, 23 pages.
Datron/Transco Inc., News Release dated Jul. 17, 1996 with information sheet for DBS-4000 In-Motionj Satellite System, 3 pages.
Datron/Transco Inc. Installation Instructions for DBS-4000-100 In-Motion Satellite Television System, 1996, 24 pages.
Sea Tel Inc., Operation and Installation Manual for Sea Tel Model 1898 Shipboard Satellite TV System, Oct. 2001, 51 pages.
Sea Tel Inc., Installation and Operation Manual for Sea Tel Model 2094 Shipboard Satellite TV Receive-Only System, May 1996, 81 pages.
Sea Tel Inc., Installation and Operation Manual for Sea Tel Model Coastal 18 Satellite TV Receive-Only Antenna with Motorized Polarization, Feb. 23, 2006, 88 pages.
King Controls Brochure for King Dome Automatic Satellite System, 1998, 2 pages.
King Dome Satellite Locator System product informaiton, Mar. 5, 1999, 47 pages.
Telemetry & Communications Systems, Inc. "Model 600 Transportable Antenna System," various product information, Apr. 2001 and as indicated, 10 pages.
SkyTerra, "MSATG2 Mobile Satellite Radio User Guide," Rev. B, 2005, 44 pages.
TracStar Systems, "SV360 Installation and Operations Manual," Digital Video Broadcasting, 2005, 66 pages.
KVH TracVision M3 literature, KVH Industries, Inc., 2005, 6 pages.
Dr. Frank Baylin, excerpts from Digital Satellite TV, Baylin Publications, Boulder CO, 1997, 11 pages.
Samuel Silver, excerpts from Microwave Antenna Theory and Design, Boston Technical Lithographers, Inc., Lexington, MA, 1963, 10 pages.
Internet printout of http://www.naval.com/414-Idis.htm regarding the PR-414 Marine TV Antenna, printout dated Apr. 29, 2009, 2 pages.
Harold Pender, Penders's Handbook for Electrical Engineers, 1949, 2 pages (6-78 and 6-79), John Wiley & Sons, Inc., United States, 2 pages.
Winegard Co., Installation/Operation manual for RoadTrip LP1000 Satellite System, Jul. 20, 2004, 20 pages.
Winegard Co., manual for Movin View Digital Satellite Mobile Antenna for Two Receivers Model MV3500A, May 2005, 12 pages.
Telemetry & Communications Systems, Inc. "Model 600 Portable Antenna System" brochure, Sep. 2003, 2 pages.
VuQube Model V10/V20 product literature, Wallace Technologies, 2006, 2 pages.
VuQube Model V10 Installation and Operating Manual, Wallace Technologies, 2006, 12 pages.
Winegard RoadTrip® Minimax Stationary Automatic Satellite TV Antenna Manual, 2009, 12 pages.
Winegard Carryout Quick Start Guide, 2010, 4 pages.
Winegard Carryout webpage, Apr. 29, 2009, 3 pages.

* cited by examiner

SATELLITE TELEVISION ANTENNA SYSTEM

PRIORITY

This application is a continuation of U.S. patent application Ser. No. 13/680,042, filed on Nov. 17, 2012, which claims the benefit of U.S. Provisional Application Ser. No. 61/561,820, filed on Nov. 18, 2011, the entirety of both of which is hereby incorporated herein by reference.

FIELD

The present invention relates generally to satellite television antenna systems, and more particularly, to a satellite television antenna system that interacts with a Set Top Box (STB) to obtain satellite identification information.

BACKGROUND

The growth in the number of available media channels and improved reception due to digital broadcasts has driven consumers to look beyond normal television antennas and cable systems. Digital signals broadcast from satellites are capable of providing hundreds of video, audio and data channels to users without the constraint of land line connections. The programming is distributed by a constellation of satellites parked in geostationary orbits at 22,300 miles above the earth. These broadcasts from orbit allow users to receive the broadcasts in many areas; such as mountainous regions or desolate areas, where earth-based transmitters or cable infrastructure traditionally are unable to reach.

A satellite can only broadcast a finite amount of data simultaneously. Therefore, it is sometimes or often necessary for satellite programming providers, for example DISH Network and DirecTV in the United States, to spread their programming across multiple satellites located at different positions or slots in the sky. Thus, for a customer to receive their full compliment of programming, their satellite antenna equipment must aim, lock onto and switch between two or more satellite positions (e.g. 110 degrees, 119 degrees, etc.) depending on which television channel the user has selected via their STB.

For house-mounted antenna systems, a single dish with multiple feed horns can be adjusted in elevation, azimuth and skew so that the data being broadcast from multiple satellite locations can be received simultaneously. Alternatively, two or more dishes may be used. In either case, once the dish is properly aimed and secured, it is not necessary to re-adjust because the house does not move. Often a trained technician is hired to perform the setup and aiming tasks because it must be ensured that the antenna(s) are accurately aimed and oriented at all of the correct satellites corresponding to the programming package to which the user has subscribed. However, providing a solution for mobile environments is a far more complex endeavor.

When a broadcast satellite signal is received by a satellite antenna, an output signal is relayed to a STB. The STB (also referred to as an integrated receiver decoder or IRD) then decodes the audio and video signals, and outputs the decoded signals as regular audio and television signals to be displayed on a television set and played by an audio system. The STB includes certain components, such as microprocessors with corresponding programming code, to determine which satellite is necessary to correspond to the channel selected by the user. The STB also contains electrical components and associated programming to decode the satellite identification information broadcast by each compatible satellite. One common method is referred to as Digital Video Broadcast (DVB) and can be decoded by a DVB circuit board disposed within the STB, which may be integrated or a separate component. Then, using a communications protocol called DiSEqC, the STB can communicate with the individual signal converters (low noise block converters (LNBs)) of the satellite antenna(s) to selectively turn them on and off as required to receive the correct feed corresponding to the desired satellite position as determined by the STB based upon the channel selected by the user.

The positioning of the satellite signal receiving antenna becomes problematic when it is configured as a mobile antenna, such as for vehicle mounting or for portable hand carrying. Mountable satellite antennas may, for example, attach to a bus, boat, motor home, trailer, commercial vehicle, van, camper, trailer or other mobile unit. When such configuration of satellite communication systems are moved to a new location, the elevation and azimuth angles (orientations) of the antenna must be adjusted to align the antenna with the selected satellite. Determining satellite location is especially problematic to the user who may be in a new location every night (or throughout the day). For example, many buses and recreational vehicles have their satellite antenna systems installed on the roof of the vehicle. When they park at night they may have to first position the antenna to an operating position and then adjust elevation and azimuth position to locate the desired satellite.

Due to packaging and cost requirements, most conventional mobile/portable satellite TV antennas can only aim at one satellite position at a time. This allows the systems to be enclosed, made less expensive and packaged smaller than they otherwise would need to be because dish size can be reduced and skew does not need to be adjusted compared to antenna systems like those mounted to the roof of a house that point at multiple satellite positions simultaneously.

Conventional mobile/portable antennas, such as those disclosed in U.S. Pat. No. 7,595,764 and U.S. Pat. No. 6,538,612, both of which are hereby incorporated by reference in their entirety, thus must be able to change elevation and azimuth so that they are aimed at the correct satellite position; the one that corresponds to the channel the user selected on the STB.

Conventional mobile/portable satellite antennas operate independent of the STB to which they are connected. For example, these devices typically include an onboard DVB board as part of the antenna control system so that the mobile/portable antenna can positively determine the identification of which satellite it is locked onto or needs to switch to. Use of such on-board DVB decoders greatly speeds up the searching process compared to a blind search methodology. However, the inclusion of the redundant DVB hardware and software adds cost, complexity and weight to the mobile satellite antenna. It is also an additional component that could fail. Thus, there is a need to provide for a system, method and device that reduces cost, weight and complexity of the conventional mobile or portable satellite antenna system, and improves reliability, without removing the ability to efficiently operate automatically.

SUMMARY

The present invention addresses certain deficiencies discussed above by providing for a device, method and system of enhanced interaction between the STB and the portable or mobile antenna system in order to eliminate redundant components from the antenna system.

The satellite antenna device of one embodiment of the present invention can be configured as a motorized portable device that enables easy satellite television reception while camping, tailgating, ice fishing, visiting summer cabin, etc. The system requires no deployment and is enclosed in a light weight, small enclosure with, or without a carrying handle. The microprocessor-based antenna control system included in the motorized satellite antenna device receives a set of desired satellite identifications (IDs or network identifications (NIDs)) from a set top box (STB). The antenna device scans the sky and locks onto a satellite candidate by measuring microwave radiation. The antenna acquires identification of the satellite candidate from a STB, if such identification is possible. Then, if the candidate was identifiable, the antenna system compares the candidate's ID to the set of desired satellite IDs. If the candidate ID is a member of the set, then the satellite antenna's orientation is stored in memory. The antenna then attempts to acquire the remaining members of the desired satellite IDs until all are acquired or no further candidates remain. If the candidate is not identifiable, or not a member of the set, then the antenna proceeds to the next satellite candidate. Other embodiments, features and functions will be apparent from the detailed description below, and from the appended figures.

By providing a positive identification of satellites to the antenna by the STB, redundant components can be eliminated. For example, the DVB decoding element in a conventional portable or mobile satellite antenna system can be eliminated because the definitive satellite identification information can be supplied by the STB. As a result, antenna product and manufacturing costs are reduced, antenna manufacturing is easier and faster, and the weight of the product can be reduced. Reliability and quality of the antenna are also improved. Other redundancies that can also be eliminated include the need for a separate user interface, setup of system parameters, and redundant power supplies. In addition, there is no need to provide a separate costly and easily lost remote control for independently controlling operation of the antenna system.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1A:
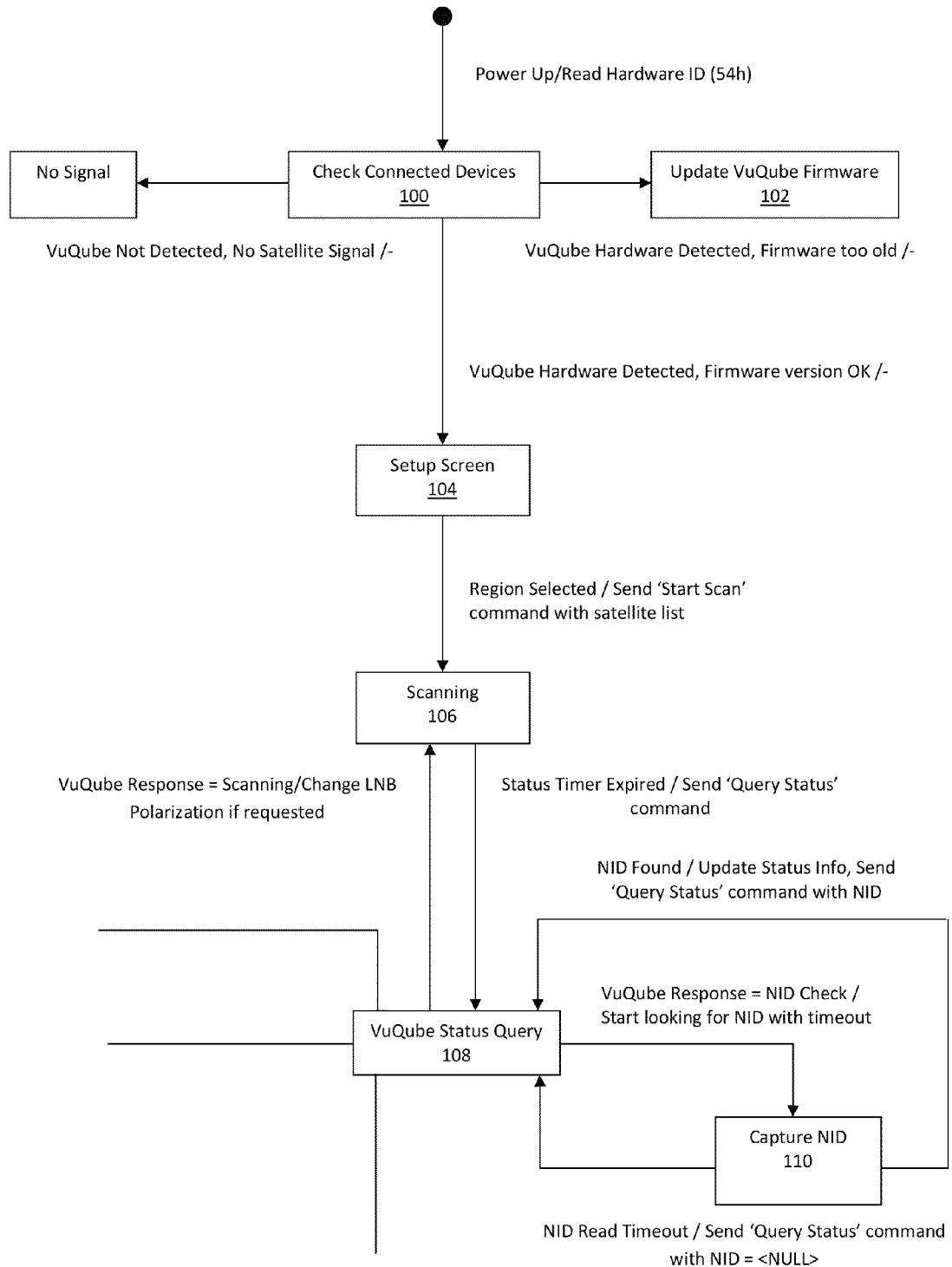
FIGS. 1A and 1B are a schematic showing operation of a satellite television viewing system, including a STB and a portable antenna system, according to an example embodiment.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. Conventional operating logic for transportable satellite antenna devices is known to those having skill in the art, and therefore, will not be repeated herein.

The antenna apparatus can be configured as an manually or hand transportable antenna system (with or without handle) such as that disclosed in U.S. Pat. No. 7,595,764, the entirety of which is hereby incorporated by reference herein. Indeed, portions of the following description refer to the VUQUBE® (VQ) hand portable motorized and enclosed satellite TV antenna product. This product is available from King Controls at www.kingcontrols.com. However the present invention can also be adapted to any manner of satellite television antenna products and configurations. For example it can be adapted to a vehicular mobilized satellite antenna product for mounting on the roof of a vehicle such as the KING DOME® antenna product, also available from King Controls. Additionally, the disclosure of U.S. Pat. Nos. 6,864,846 and 6,937,199, and the disclosure of U.S. application Ser. No. 12/845,488, filed on Jul. 29, 2010, are all hereby incorporated by reference herein in their entirety as these references show additional satellite antenna device examples that can be adapted to certain embodiments of the current invention.

The operations, structural devices, acts, modules, logic and method steps discussed herein below, according to certain embodiments of the present invention, may take the form of a computer program or software code stored on a tangible or non-transitive machine-readable medium (or memory) in communication with a processor which executes the code to perform the described behavior, function, features and methods. It will be recognized by one skilled in the art that these operations, structural devices, acts, logic, method steps and modules may be implemented in software, in firmware, in special purpose digital logic, and any combination thereof without deviating from the spirit and scope of the present invention as recited within the claims attached hereto.

Figure 1B:
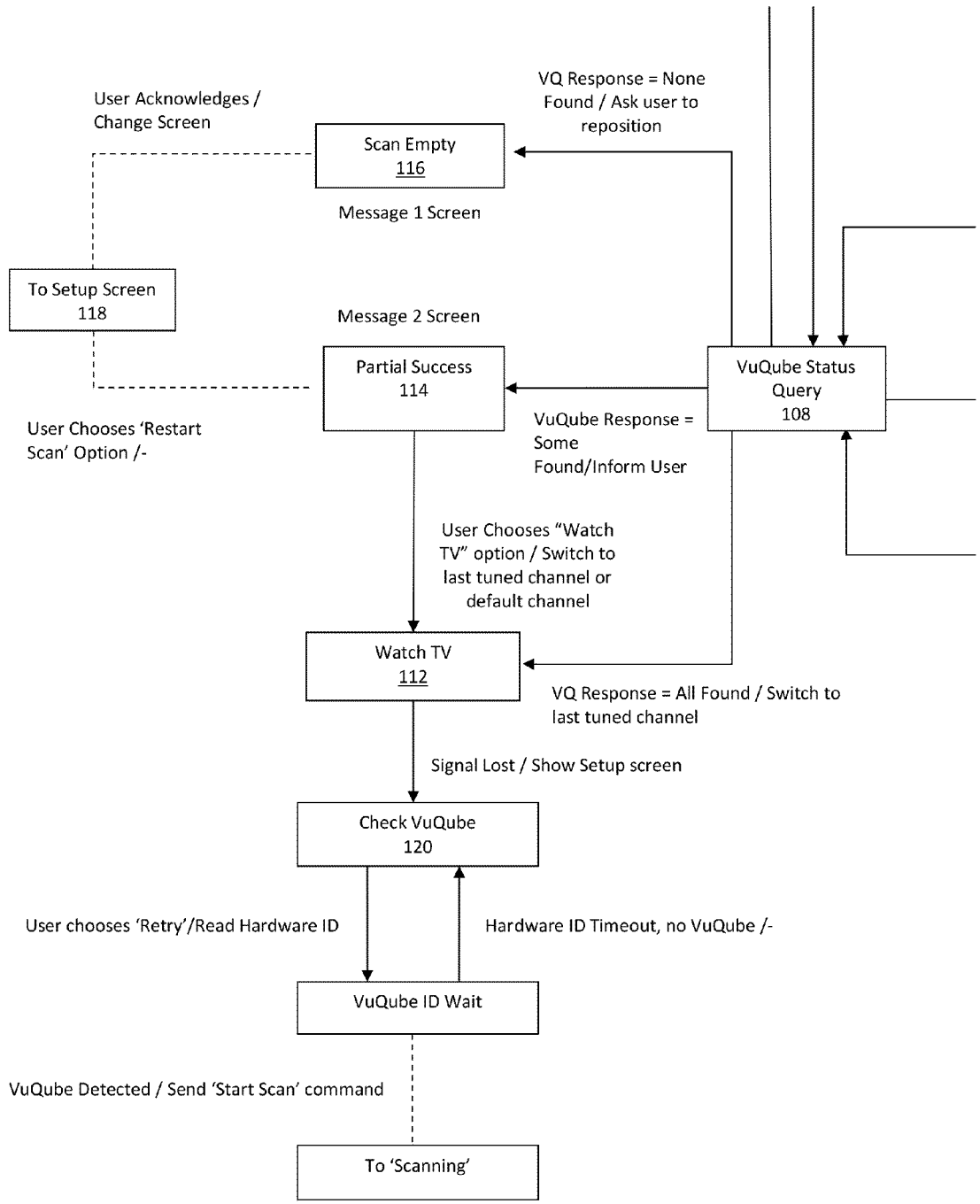

General satellite antenna system operation and interaction with the STB according to one example embodiment is depicted in the flowchart of FIGS. 1A and 1B, which pertains generally to the following descriptions of certain operational states. Detailed discussion of certain aspects will be discussed with regard to FIGS. 2-11.

Referring then to FIGS. 1A and 1B, the STB queries through the communicating line attached to the antenna to determine the identity of the antenna that is connected 100. The responses can include a determination that there is no antenna connected, that a home or fixed antenna is connected or that a mobile/portable antenna is connected. If a mobile/portable is connected, then an antenna firmware update check can be performed and the firmware updated, if necessary 102.

Next, a setup or startup screen is presented to the user on the television connected to the STB 104. The setup screen can, but need not, request certain information from the user such as geographic location.

Then an exchange of data occurs between the STB and antenna, including data relayed from scans 106 by the antenna in response to status queries by the STB 108. This exchange includes the STB providing the antenna with the network identifications (NIDs or IDs) of each satellite candidate 110 that the antenna locks onto. This process continues until all of the desired satellites are found (so the user can watch the full set of TV channels 112), or until no further satellite candidates can be identified by the antenna. This latter condition may be the result of some, but not all, of the desired satellites being found 114, or may be the result of an inability to find any of the desired satellites 116. The user setup screen may be updated with status messages during the satellite acquisition process 118.

If satellite signal is lost as noticed by the STB, it sends an antenna check query 120 through the communication line to the antenna. If no recognized hardware is found, the user can be prompted to check the antenna connection, or some other suitable error warning. The STB can continue to check for an antenna connection until one is found. Once a viable antenna is located, the process can start again, or the previous status can be resumed if a predefined timeout period has not expired.

Figure 2:
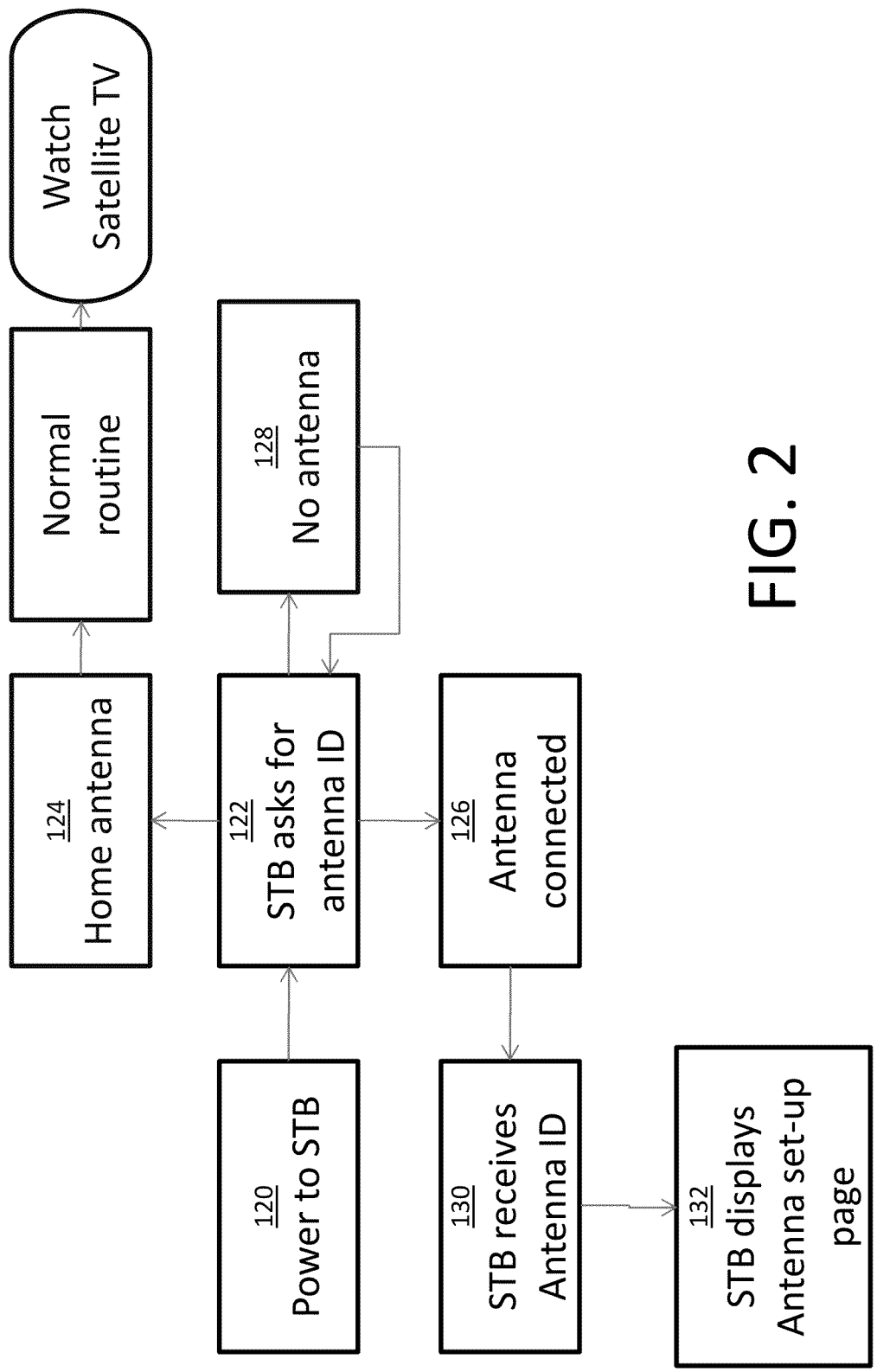
FIG. 2 is a schematic of a power up routine for a satellite television viewing system according to an example embodiment.

Certain aspects of the system operation, function and features will now be described with respect to FIGS. 2-11. Referring in particular to FIG. 2, the logic of normal power up routine for a STB is shown in greater detail. A coaxial cable can be used to connect the STB to the antenna system to provide a means for communication or communication line therebetween. This single cable can also be the same cable through which satellite broadcast signals received by antenna are transmitted to the STB. Thus, the communication line connecting the antenna to STB can be a two-way communication conduit. Other communications means such as wireless (e.g., Wi-Fi, Bluetooth, radio, infrared, cellular, etc.) may also be used. Signals can also be exchanged over multiple communications conduits and means. Power to the antenna can also be supplied by the STB to the motorized antenna device by the same single cable line through which the two-way communications are occurring. Thus, cables, cost and setup complexity are minimized. Reliability and quality are also improved.

After the STB is powered up 120, the STB queries for antenna identification 122. The STB thus can determine whether a home/fixed antenna is connected 124, whether a motorized mobile/portable antenna is connected 126 or whether no antenna is connected 128. The STB can be configured to default to home/fixed antenna operation if no antenna is connected. But if a motorized mobile/portable antenna is connected, then the ID of such antenna is obtained 130. A set-up page or status page can also be displayed on the user's television screen 132.

The portable antenna system is placed by the user in a location with an unobstructed view of the relevant hemisphere of the sky (e.g. southern in the United States and Europe, northern in Australia and South America). The vehicle to which a mobile unit is attached would be moved, if necessary, to satisfy the same criteria. The STB is plugged into a power source, which also powers on the antenna system via the communication line or conduit. Alternatively, the antenna system can be provided with a separate direct or remote power switch. After powering up, the STB initiates an antenna identification and/or authentication query over the DiSEqC bus. The motorized mobile/portable antenna system is configured to respond with suitable identification or authentication information. This identification step can be performed, for example, automatically at power up, after the user presses a reset on the STB, or as initiated by the user via the STB user on-screen set up options interface.

Figure 3:
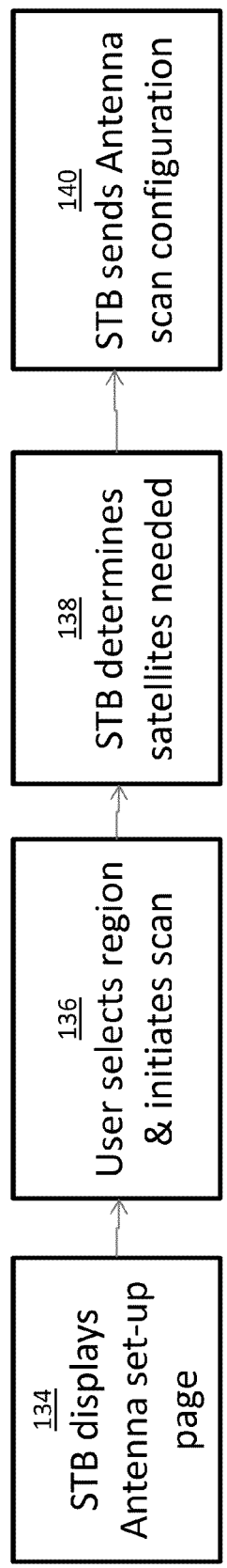
FIG. 3 is a schematic of a satellite television antenna system set-up routine according to an example embodiment.

Referring now to FIG. 3, once the STB recognizes the mobile/portable antenna system, the STB displays the presence of the specific antenna system on the TV set up screen 134. The STB may also display the hardware and firmware version number, and the antenna configuration information. The user may be queried via prompts presented on the screen such as that shown in FIG. 4, to enter geographic information 136, such as a state, zip code or other location identifier. The STB in certain embodiments can use this geographic data and the user's subscription information (e.g., Dish1000) to determine the set of satellites to be acquired by the antenna 138. Thereafter the STB automatically transmits to the antenna over the communications line the set or group of satellite IDs that are to be located and identified to watch TV 140. This is also referred to as the set or group of desired satellites. Each member of this group is referred to as a desired satellite. The antenna stores the set of desired satellite IDs (NIDs) in memory so they can be accessed during the satellite acquisition process.

Referring to FIG. 5, it is again shown that the STB contains code to determine the set of desired satellites 138, the IDs of which are sent to and stored by the antenna 140. Prior to full scan, the antenna system sends a busy flag message to the STB 142 to indicate that scanning mode has been initiated. This causes the STB to update the LNB voltage and prepares for querying antenna system status 144. The status can be queried every 500 milliseconds for example, or some other acceptable value given the hardware employed. The LNB voltage is held at the requested level while the busy/scanning flag is set in response to status queries. A stable LNB voltage helps the antenna system to normalize the measurement of the microwave energy of any detected satellites. The invention can also be practiced without the setting of the LNB voltage steps depending on the type of LNB used in the antenna.

The antenna system resets the motor drive 146 and starts a sky scan routine. The antenna first rotates its reflector dish via an azimuth motor to monitor background microwave signal (MW level) in order to set a signal-to-noise ratio 148. Then a scan is performed 150. During the scan, one or both of the azimuth and elevation motors of the antenna are actuated to move the dish in order to locate microwave (MW) hotspots 150. These hotspots are the satellite location candidates that will be further evaluated as discussed below.

The antenna can also calculate a target elevation angle range based upon geographic location information provided by the STB. This calculation enables the antenna to begin its scan at a specified elevation or range of elevations in order to potentially reduce the search time needed to find satellite candidates. Another alternative to receiving location information from the STB is to provide the antenna with an onboard GPS receiver so that the antenna can use GPS data to determine appropriate elevation angle for its current location and quickly find satellite candidates.

The GPS data from the antenna (or from STB internal GPS if so equipped) can also be used by the STB to enable or disable local programming corresponding to the location of the antenna and STB. For example, the STB can use location information to determine that it is not located in the user's "home" location, so programming corresponding to that "home" location can be disabled. In another example, the STB can enable local programming corresponding to the current location of the user so that the user can access and view programming that is designated as local to the user's current location.

If the STB is unable to maintain the requested LNB voltage when in mobile/portable antenna system-STB mode, the antenna system can include additional hardware that would accept a range of voltages from the STB and follow the STB DiSEqC commands to control the LNB polarization by controlling LNB voltage locally. For this alternative, the overall control sequence would remain very similar to that described above, and will therefore, not be repeated herein.

Figure 6:
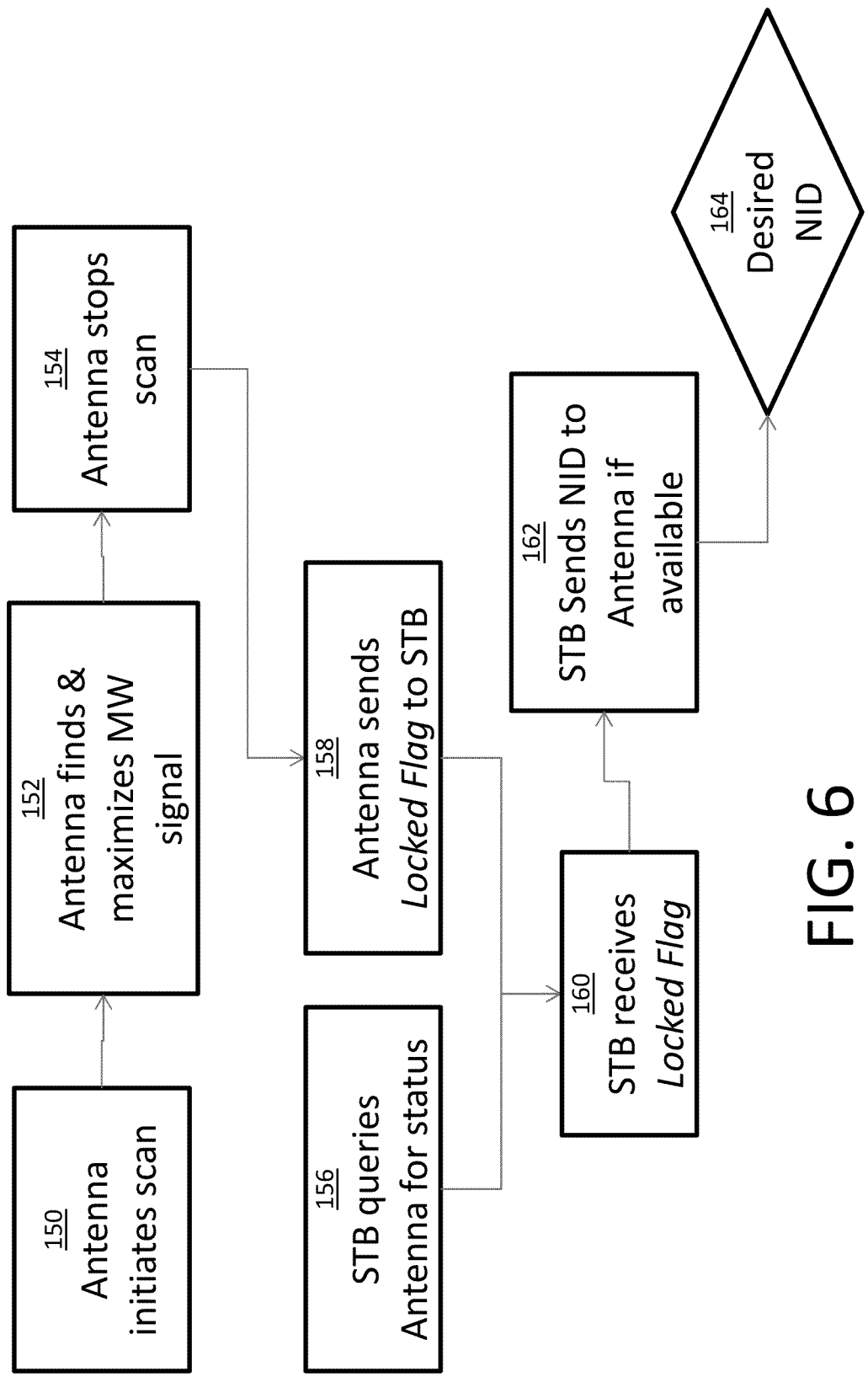
FIG. 6 is a schematic showing an aspect of satellite locating scan routines of a satellite television viewing system according to an example embodiment.

Referring now to FIG. 6 the scanning process will now be described in greater detail. After initiation of a sky scan 150, the antenna scans the sky in a predetermined pattern until it finds a MW signal that it identifies as a satellite candidate. One way this can be done is to look for MW energy hotspots that stand out against the background MW level. It can also be done other ways without departing from the scope of the invention. While the scan process is proceeding, the STB repeatedly queries the antenna for status (e.g. every 500 ms) 156. Once a candidate is found, the antenna locks onto and peaks or maximizes the lock for that candidate 152. The scan is stopped 154 and a locked flag is sent to the STB 158. The STB receives the locked flag 160 and decodes the NID of the satellite candidate from the candidate satellite's broadcast data stream being passed to the STB from the antenna over the communication line. The STB then passes the NID, if available, for the candidate satellite back to the antenna 162 in the next status exchange. NID is the network ID information contained within the satellite television data feed being broadcast from every such satellite.

The antenna control system in the antenna apparatus then compares the NID of the satellite candidate as provided by the STB to the list of NIDs for the set of desired satellites 164. The antenna control system acts appropriately on the candidate NID to determine whether it has detected a member of the desired set and then continues the scan to try to detect any remaining members of the set of required (desired) satellites.

Figure 7:
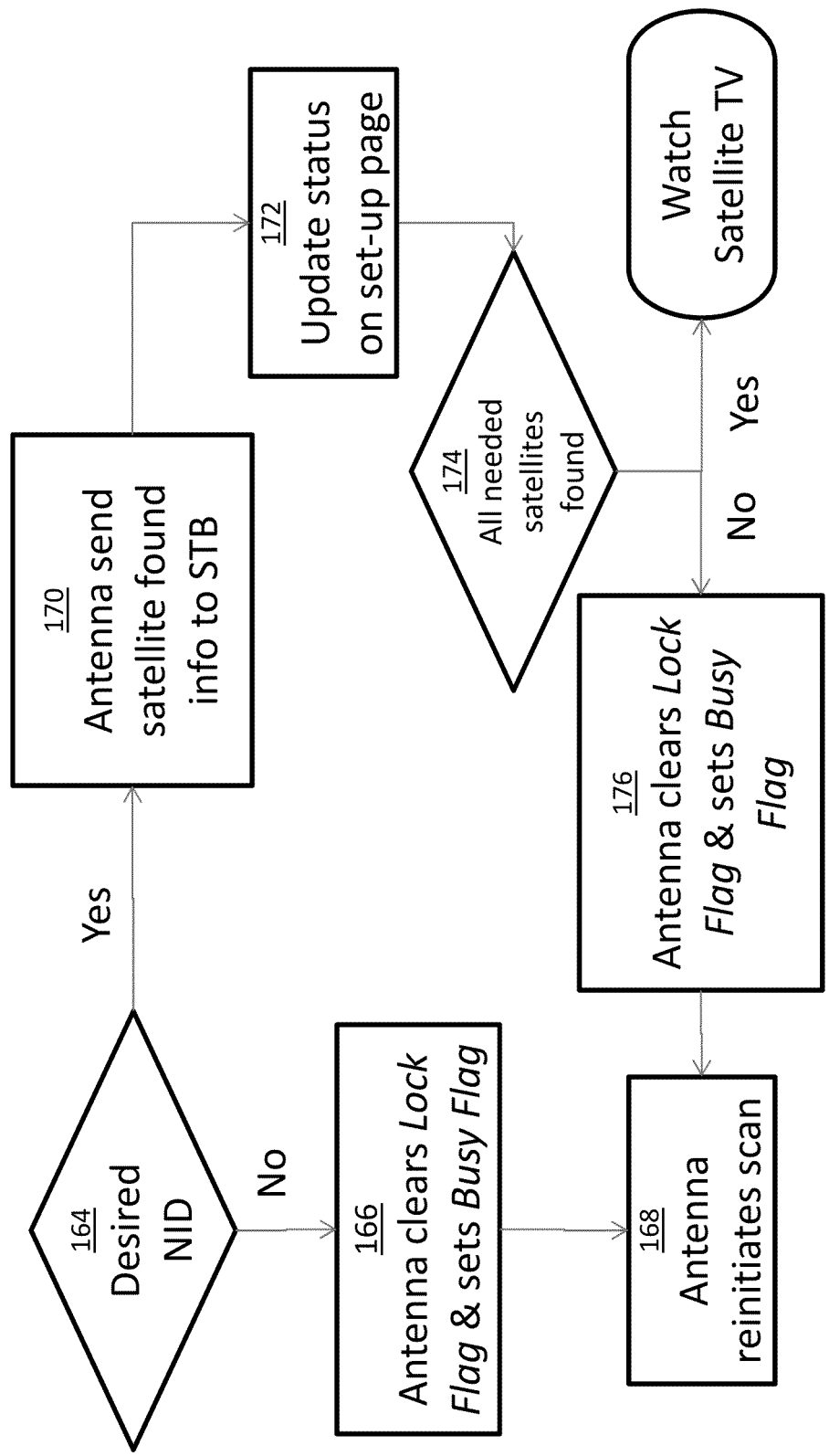
FIG. 7 is a schematic showing an aspect of satellite locating scan routines of a satellite television viewing system according to an example embodiment.

FIG. 7 further illustrates the process by which the antenna system interacts with the STB to determine whether a given satellite candidate is a member of the set of desired satellites and whether all member desired satellites have been found. The antenna control system receives a candidate NID from the STB and compares that candidate's NID to the set of desired NIDs as previously provided by the STB 164. If a particular satellite candidate is either (1) unidentifiable or (2) identified, but not among the list of satellites needed (desired), the antenna clears the lock flag, sets a busy flag 166 and resumes the scan process 168. This process repeats until a satellite is identified that is among the set of desired satellites. If a desired satellite is found, then the antenna sends a satellite found message to the STB 170. The STB may also then update the status on the user's set up page 172.

The antenna control system also stores in memory the orientation information for its reflector dish (e.g., elevation angle and azimuth) for a given satellite that is determined to be a member of the set of desired satellites. This allows the antenna to quickly move (or switch or jump) from a current desired satellite location to another desired satellite location when it receives a switch command from the STB. The satellite antenna control system can also store the dish orientation information corresponding to satellite candidates that it determines to not be among the set of desired satellites. By storing this latter orientation data, the antenna system can avoid locking onto the same non-desired candidate again.

The antenna control system also decides if any additional desired satellites still need to be found 174. If yes, then the antenna clears the lock flag, sets a busy flag 176 and resumes scanning 168. This scan and evaluation process described above repeats until all desired satellites in the set are found or until the antenna cannot identify any more satellite candidates. As desired satellites are found, status can be updated on the viewer's set up page 172.

When the antenna system has finished scanning (either by finding all required satellites, by finding no satellite candidates or finding some of the desired satellites after evaluating all possible candidates), it responds to a status query by the STB with a Scan Complete message. This message also carries a code for one of the following modes of completion: all required satellites found; some required satellites found; or no required satellites found. Based on the outcome, the user may start watching TV (in the first two options) or re-start a scan procedure after trying to resolve the potential issues causing a scan failure (in the last two options).

Once the STB recognizes the scan process to be completed, the status query requests are no longer sent to the antenna system. The STB then returns to its normal operation of providing satellite television. After the sky scan is complete, the antenna system is directed to point at specific satellites via DiSEqC commands from the STB to the antenna control system. The antenna control system actuates one or more motors in response to these commands to aim or orient the antenna according to the stored dish orientation positions for the set of desired satellites.

Figure 8:
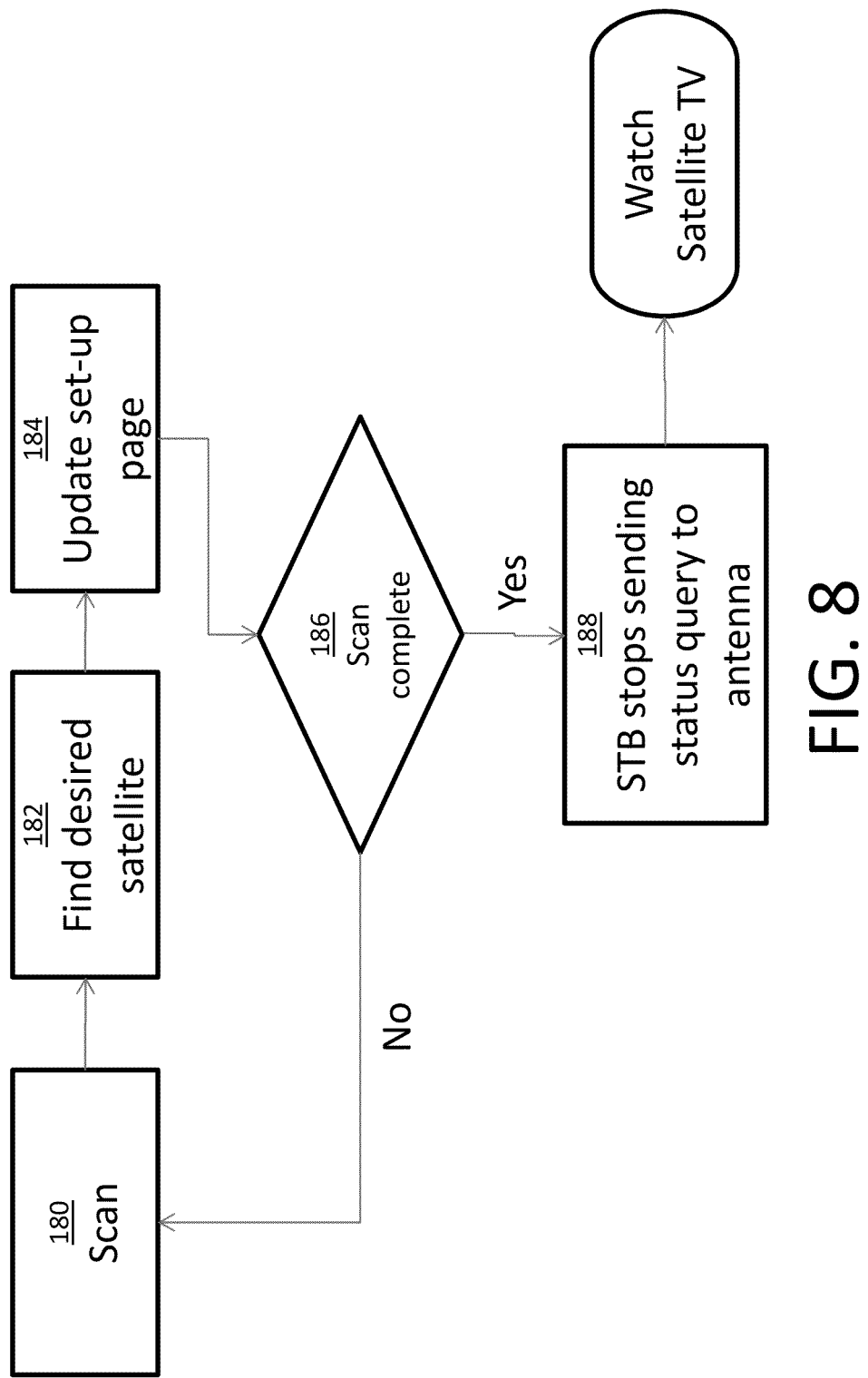
FIG. 8 is a schematic showing an aspect of satellite locating scan routines of a satellite television viewing system according to an example embodiment.

FIG. 8 shows certain aspects of the antenna system operation. The scan operation 180 is performed until a desired satellite is found 182. The setup page can be updated 184. And the antenna system compares the NIDs of the desired satellites it has found to the set of needed satellite NIDs previously provided by the STB 186. If all needed satellites were found, then an appropriate message to the STB causes the STB to stop sending queries to the antenna 188. But if not all of the desired satellites have been found, the scanning process is continued 180 in an effort to find additional desired satellite(s).

Figure 9:
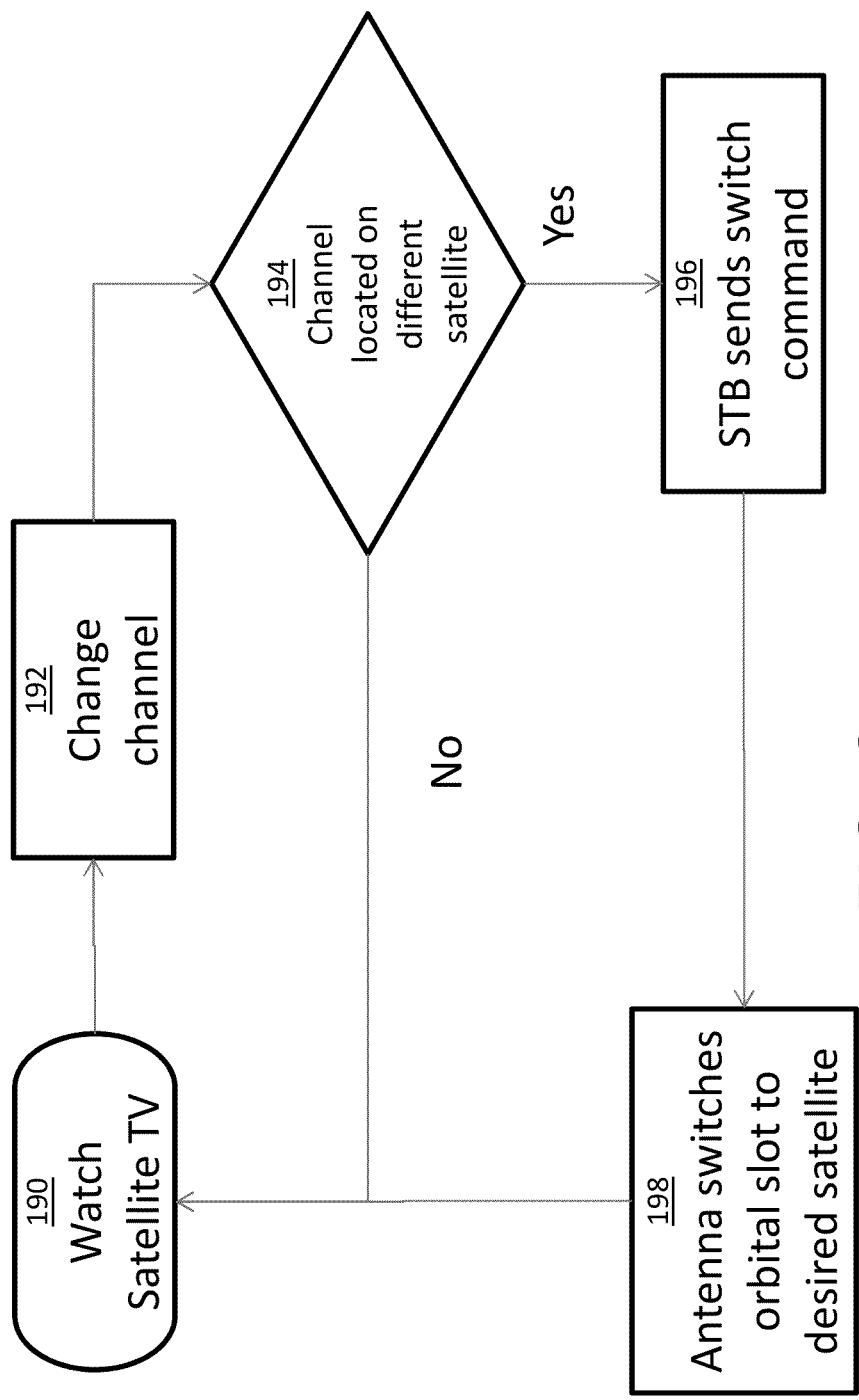
FIG. 9 is a schematic showing a satellite switching routine according to an example embodiment.

FIG. 9 shows the process to accomplish a satellite switching or jumping operation. The user would be watching television on a first channel 190. That first channel corresponds to a particular satellite slot (first slot or position) where the satellite broadcasting that channel is located. If the user changes to a second channel 192 that happens to be broadcast from a satellite at a different location or slot (second position or slot), then the antenna system must re-orient its dish to receive data from that second slot. Thus, when a user changes channels, the STB determines whether the satellite corresponding to the new channel is located on a different satellite slot 194. If no, then the STB does not issue any commands to the antenna. But if yes, then the STB sends a switch command to the antenna control 196. The information or command to the antenna can either be to simply switch (if a two-satellite position set) or the satellite ID of the slot to switch to is provided. In response, the antenna control system energizes one or more motors to move the dish to the orientation corresponding to the target satellite position 198, which was already stored in the antenna's memory.

Alternatively, the decision to switch can be made by the antenna using code executing on the antenna's processor. In such alternative, the STB sends the NID to the antenna for a given channel selected by the user. The antenna system compares the new NID to the current NID and either does not move if the NID does not change, or performs a move to the satellite slot corresponding to the NID for the new channel.

Figure 10:
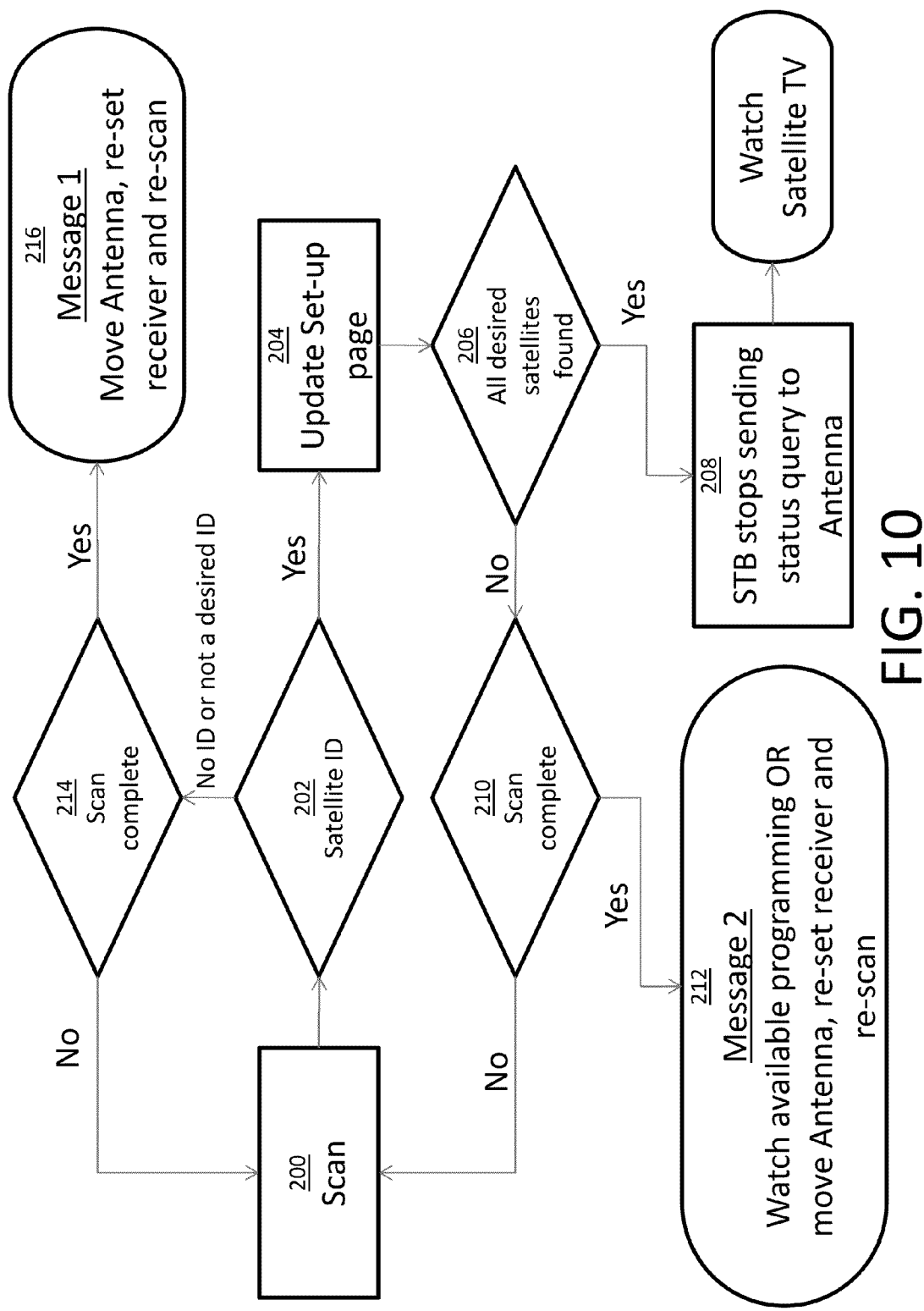
FIG. 10 is a schematic showing a scan routine aspect where less than all satellites have been found according to an example embodiment.

FIG. 10 illustrates the process of scanning for multiple desired satellites, but being unable to locate all desired satellites. The scan 200 proceeds until the antenna locks onto a satellite candidate. The satellite ID (NID) is obtained from the STB 202 and compared to the set of desired satellite IDs. If the candidate is among the list, then the set-up page is updated 204 and the antenna compares the list of located desired satellites to the set of all desired satellites 206. If all desired satellites have been found, then a message to such effect is related to the STB so the STB stops sending queries to the antenna 208. The user is then ready to watch television. But if it is determined in 206 that all desired satellites have not been located, the antenna evaluates whether it has completed a scan procedure wherein and all satellite candidates have been evaluated 210. If no, then the scan proceeds to the next candidate. If yes in 210, then the STB is informed accordingly so that a message can be presented to the user to request a choice of watching available programming or repeating the scan process 212.

Also when comparing the satellite NID in 202, the antenna determines whether it has completed its scan and evaluation of all satellite candidates 214. If the candidate satellite position ID is not among the set of desired satellite IDs (or cannot be identified) and if there are no other satellite candidates to evaluate, then the STB is informed so that the STB can display a message to the user to move the antenna and initiate a restart of the scan and acquisition process 216.

Figure 11:
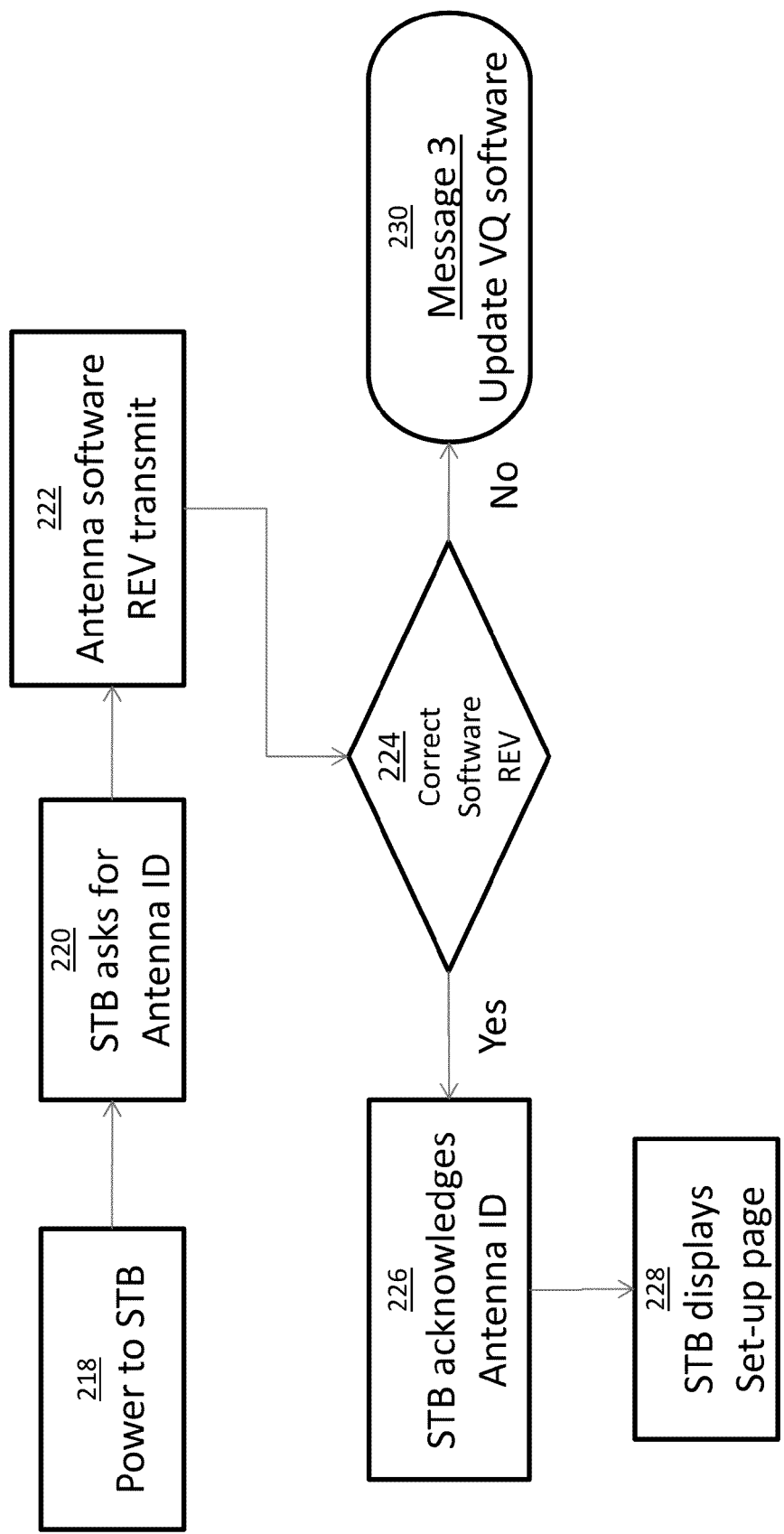
FIG. 11 is a schematic showing a satellite television antenna software update routine of a satellite television viewing system according to an example embodiment.

FIG. 11 illustrates the process of updating the antenna's firmware. After power is supplied to the STB 218, the STB queries the antenna for its ID 220. The antenna reports its ID 222. The ID contains a firmware (or software) version identifier. The STB determines whether the software on the antenna is the current or correct version 224. If yes, the STB acknowledges the antenna ID 226 and displays the setup page for the user 228. If no in 224, then the STB displays a message to the user requesting that the antenna software be updated 230. In one embodiment, the software can be updated while connected to the STB using the STB interface to transmit the updated software to the antenna. In another embodiment, the antenna can be connected to a computer with access to the World Wide Web and the user can facilitate a connection with a software update server. In a further embodiment, the antenna is directly connected to the World Wide Web to receive updates from the software update server.

The antenna control system is configured to react to several common modes of failure that might be encountered in use:

1. Failure Resulting from User Moving the Antenna on Purpose or by Accident while Sky Searching Recovery can be automatic. The antenna control system verifies that none of the dish orientations for found desired satellites have changed before returning a sky scan complete status to the STB. If recovery cannot be automatic, a message can be displayed requesting whether the user wants to watch available programming OR move satellite antenna, re-set receiver and re-scan.

2. Failure Resulting from User Moving the Antenna on Purpose or Accident after Search is Complete.

The user can re-initiate the sky search by accessing the setup screen through the STB, or could reset or powering cycle the STB. For example, the loss of satellite signal will cause the STB to present the user with a setup screen from which a new search can be initiated. In some locations, such as the United States, it is possible to then send a new request for satellite ID rather than wait for a programming download to occur as would happen on a reset or power up. This expedites the re-acquisition.

3. Obstruction of 1 or More Satellites while Searching

If less than all members of a set of desired satellites can be located, then the user can be presented with the option to watch the available programming OR move the antenna, re-set the receiver and re-scan. If no desired satellites are found, the user can be prompted to move the antenna, re-set receiver and re-scan.

4. Temporary Obstruction

Depending on where the antenna system is located, it may occur that a temporary blockage, such as a person walking in front of the system, may occur while in operation. In such instance the temporary obstruction would create a corresponding temporary error. Thus, a predetermined timeout duration is included in the antenna control system logic that must be satisfied before informing the STB and causing the STB to display a notice to the user that the antenna is attempting to acquire the satellites.

5. Temporary Power Loss

If power is interrupted, the STB may provide the user with such a notice and give the user the option to continue watching television using the pre-interruption satellite information. The user can also be given the option to re-start a sky scan.

As mentioned earlier, a setup/diagnostic screen displayed on the user's television allows the user to input selected data and customize the operation of the antenna system. One object of the screen is to minimize the amount of user input required to find satellites and watch TV, while still obtaining sufficient information to permit efficient system operation. In one embodiment, the user can be provided with a basic or initial screen to request the minimum operating information. An advanced screen selection option can also be provided so that the user can access advanced operating modes of the antenna system.

Figure 4:
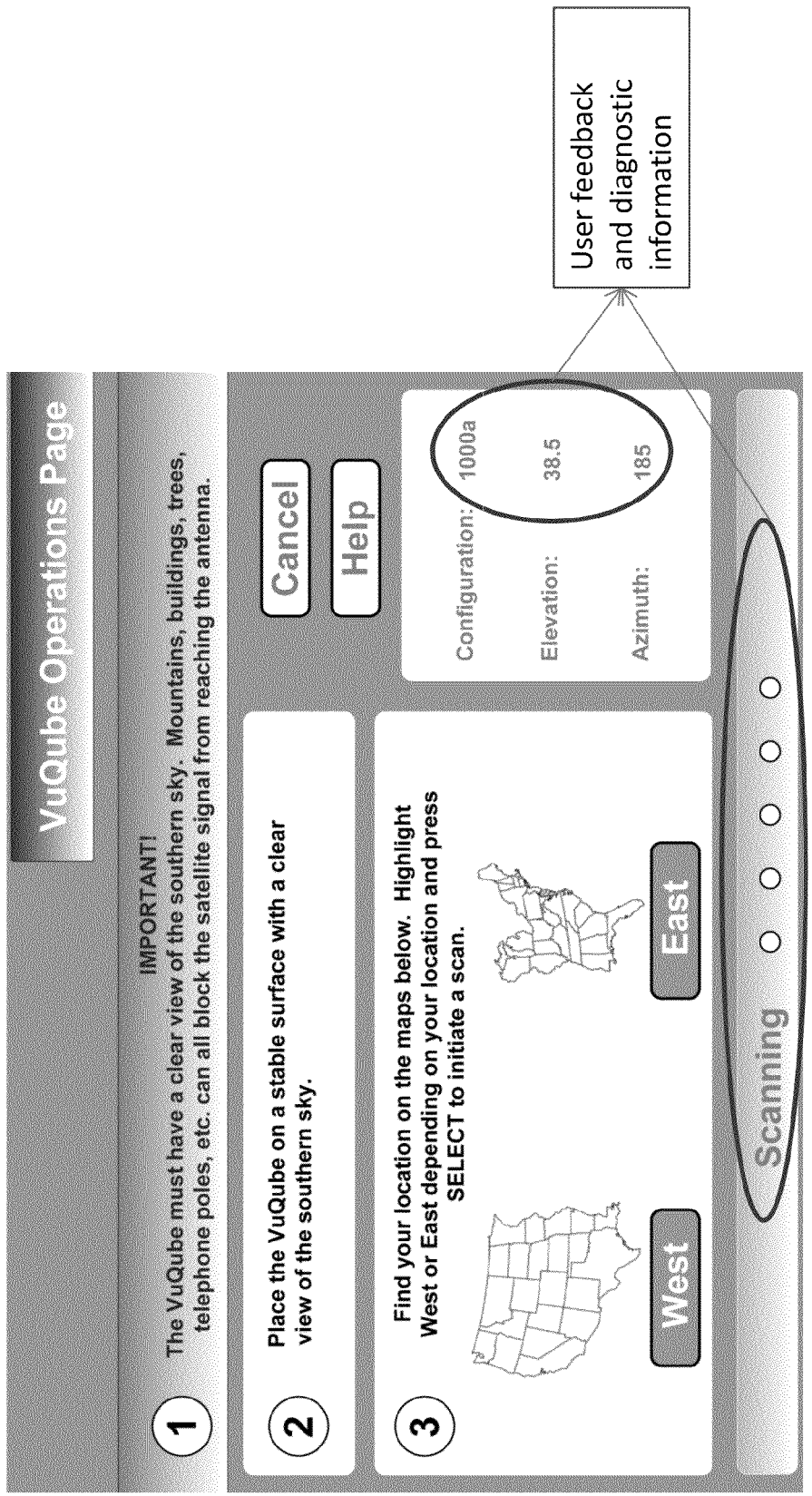
FIG. 4 is a schematic of a set-up screen of a satellite television viewing system according to an example embodiment.
Figure 5:
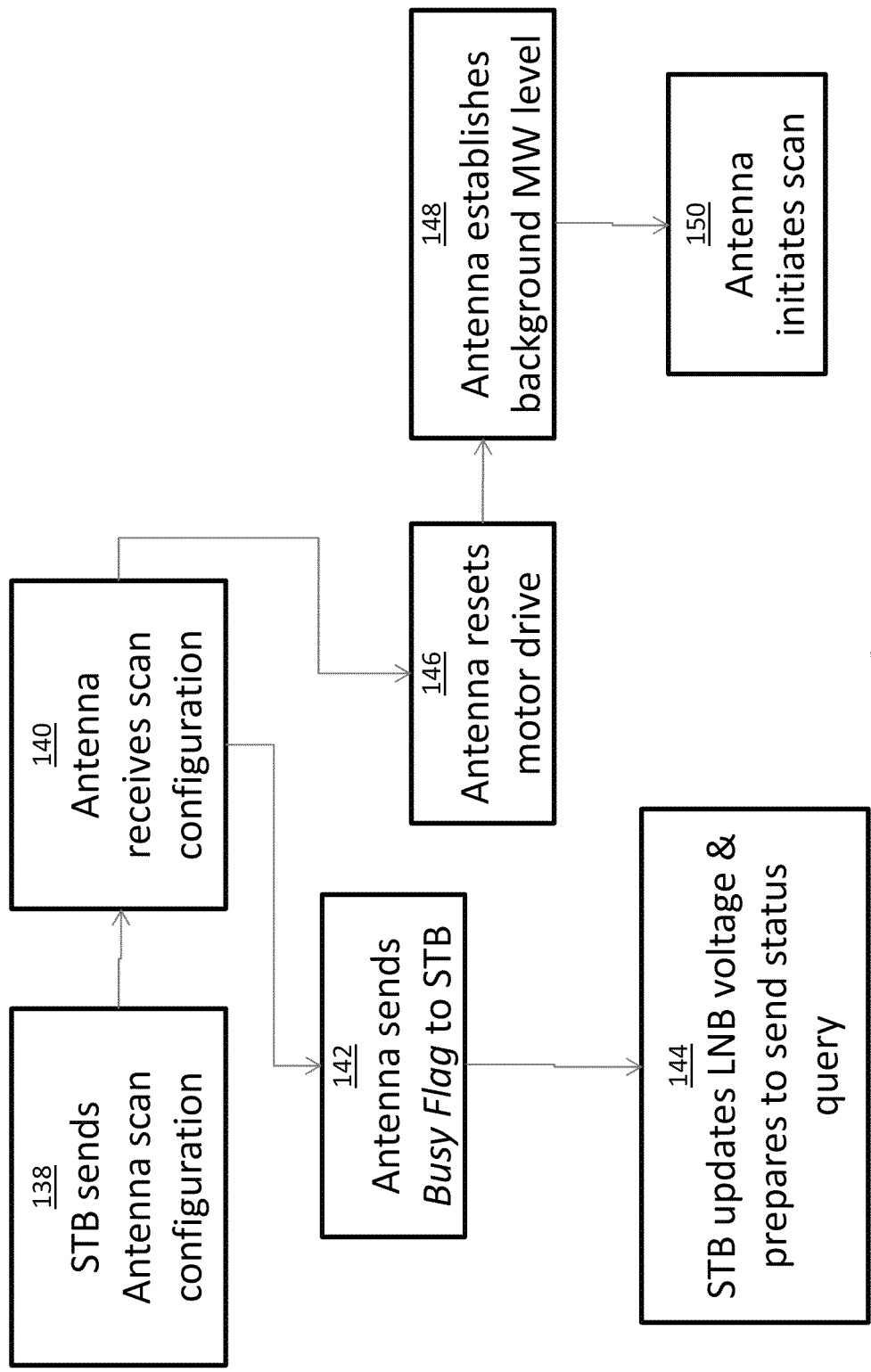
FIG. 5 is a schematic of a scan preparation routine of a satellite television viewing system according to an example embodiment.

In one example embodiment as shown in FIG. 4, the user selects geographical location on a set-up screen using a remote control and on-screen icons. Selection of region initiates search. In addition, the set-up screen can display the following information:

1. Confirmation that antenna system is installed and can communicate
2. Satellite service identification (e.g. DISH 500, DISH 1000, etc.)
3. Software revision status of antenna system software
4. Progress in accomplishing search task (e.g. busy or a percent complete)
5. Indication of satellites found
6. Vertical elevation 10 through 65 degrees (Numbers 10 thru 65)
7. Azimuth 0 through 12 (clock hours)

The STB and antenna control system can communicate via the so-called DiSEqC communication protocol. This protocol is used by many satellite programming providers for accomplishing 2-way communication through a coaxial cable. It should be noted however, that the present invention is not limited to use of the DiSEqC protocol. Other communication methods and protocols between STBs and satellite antenna components can be used without departing from the scope of the invention.

Another aspect of certain embodiments is that the two-way communication between the STB and antenna takes place over a single coaxial cable or communication conduit connecting the antenna to the STB. In addition, the satellite TV signals received by the antenna are also transmitted over this same single cable. Further the single cable can provide the power to the antenna necessary to operate the antenna, including powering the control system and the motors to aim the antenna's dish. By accomplishing all of the above items via a single coaxial cable, only one coaxial cable need be connected between the antenna and STB during setup. The antenna does not need any other connections. This is advantageous because fewer cables makes set up easier and faster, reduces cost, reduces weight, reduces likelihood of losing or forgetting components, there are fewer tripping hazards and the system after setup is more visually appealing (i.e. less cluttered). It also improves quality and reliability of the antenna.

Figure 12:
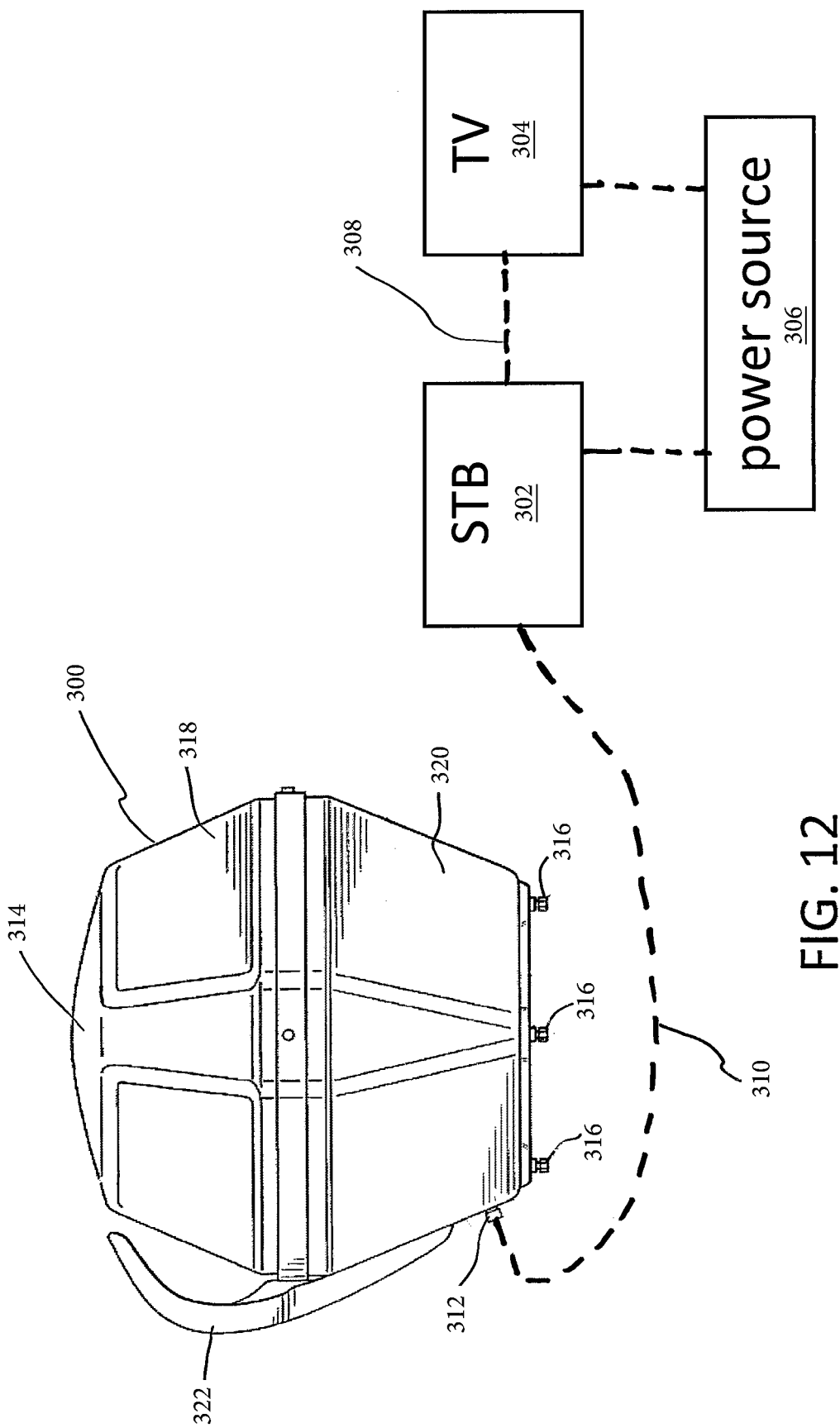
FIG. 12 is a television viewing system diagram according to an example embodiment.

Referring to FIG. 12, a satellite television viewing system according to one example embodiment includes a portable antenna unit 300, a set top box (STB) 302, a television 304 and a power source 306. The television 304 and STB 302 are both electrically connected to the power source 306. Also, the STB 302 is connected to the television 304 via a communication cable 308. This cable 308 can be a coaxial cable, an HDMI cable, component cables or other suitable connection means known to those of skill in the art. A coaxial cable 310, or other suitable cable, electrically and communicatively connects the antenna unit 300 with the STB 302. An external fitting 312 can be provided on an exterior surface of the antenna's enclosure 314 to allow signal and power to pass through the enclosure while maintaining the sealed feature of the enclosed antenna unit.

A plurality of feet 316 can be provided to the bottom of the enclosure to facilitate the antenna unit sitting on a surface such as the ground or a table, or to facilitate attachment to a bracket.

Some portions or all of antenna enclosure may comprise an electromagnetic wave permeable material that permits the inbound satellite broadcast energy to pass through the enclosure 314 with minimal loss. The enclosure may be sectioned into a top or cover portion 318 and a bottom or base portion 320 to facilitate access to the antenna components enclosed completely within the enclosure. The enclosure protects the antenna control system, motors and other components from moisture, dirt, sand, other debris and from impacts that might damage the enclosed components.

A handle 322 or other carrying means can be provided to, or defined in, the enclosure to facilitate carrying by a single hand of a user.

Figure 13:
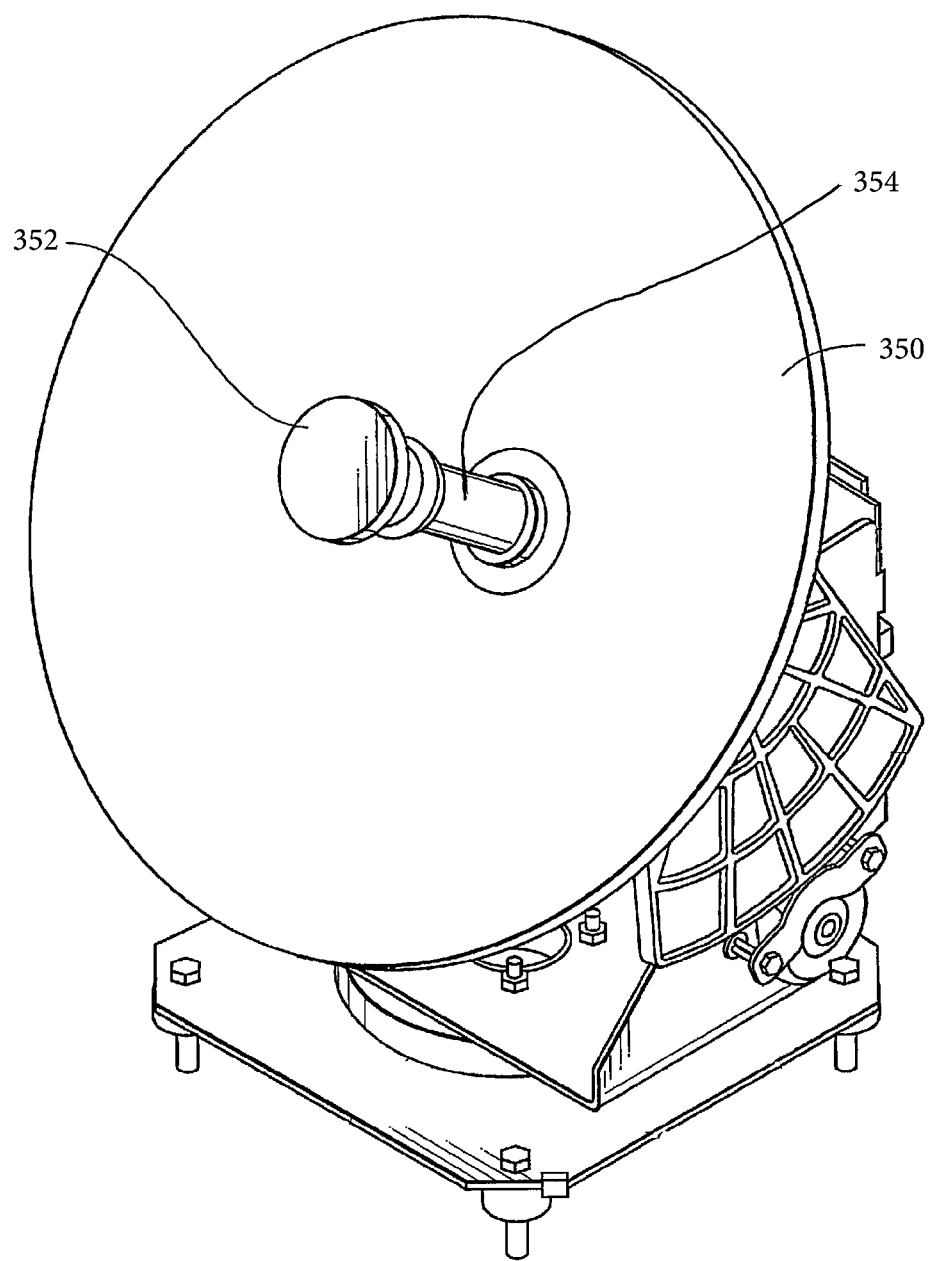
FIG. 13 is a front perspective view of a portion of a satellite antenna unit according to an example embodiment.
Figure 14:
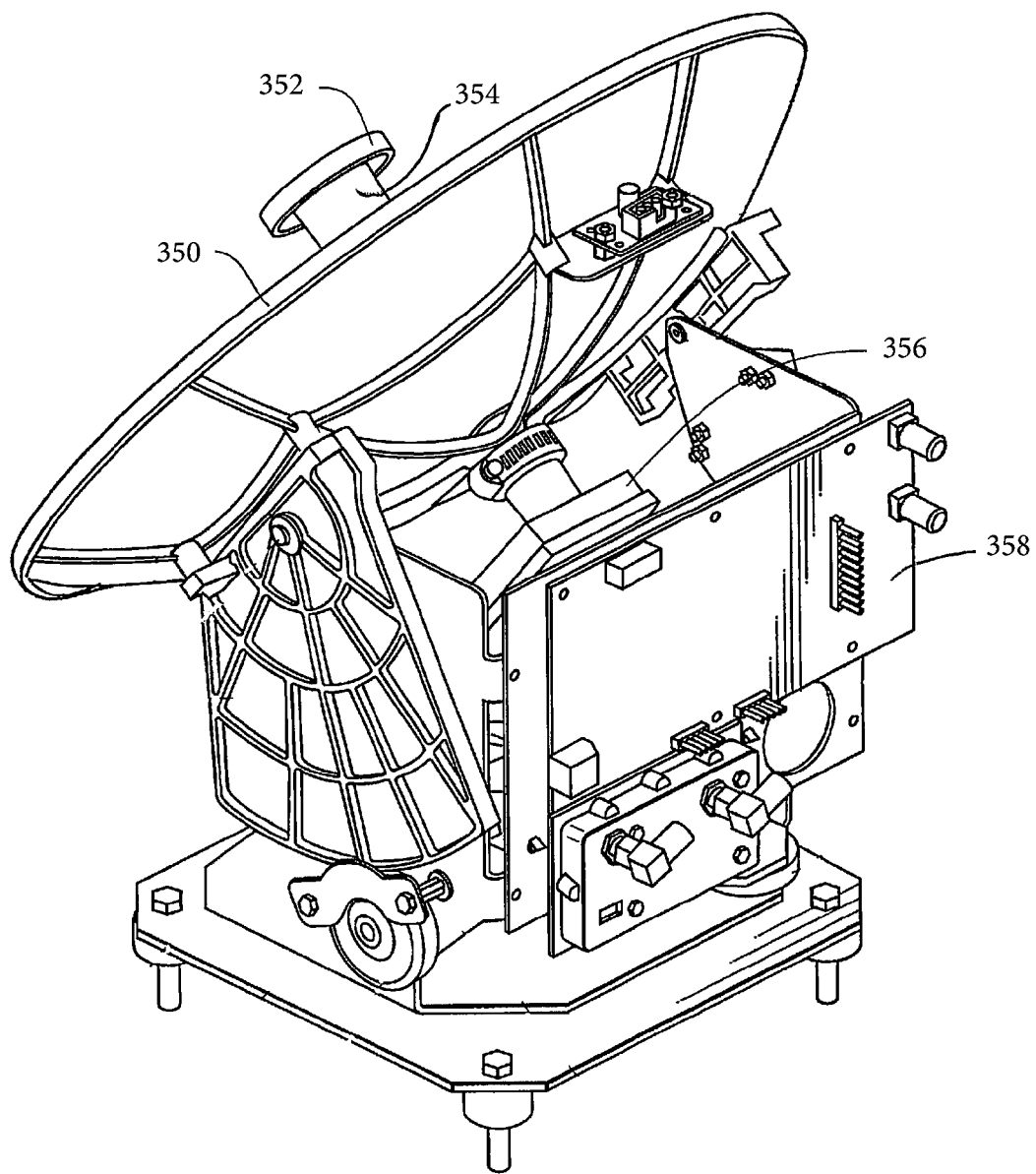
FIG. 14 is a rear perspective view of a portion of a satellite antenna unit according to an example embodiment.
Figure 15:
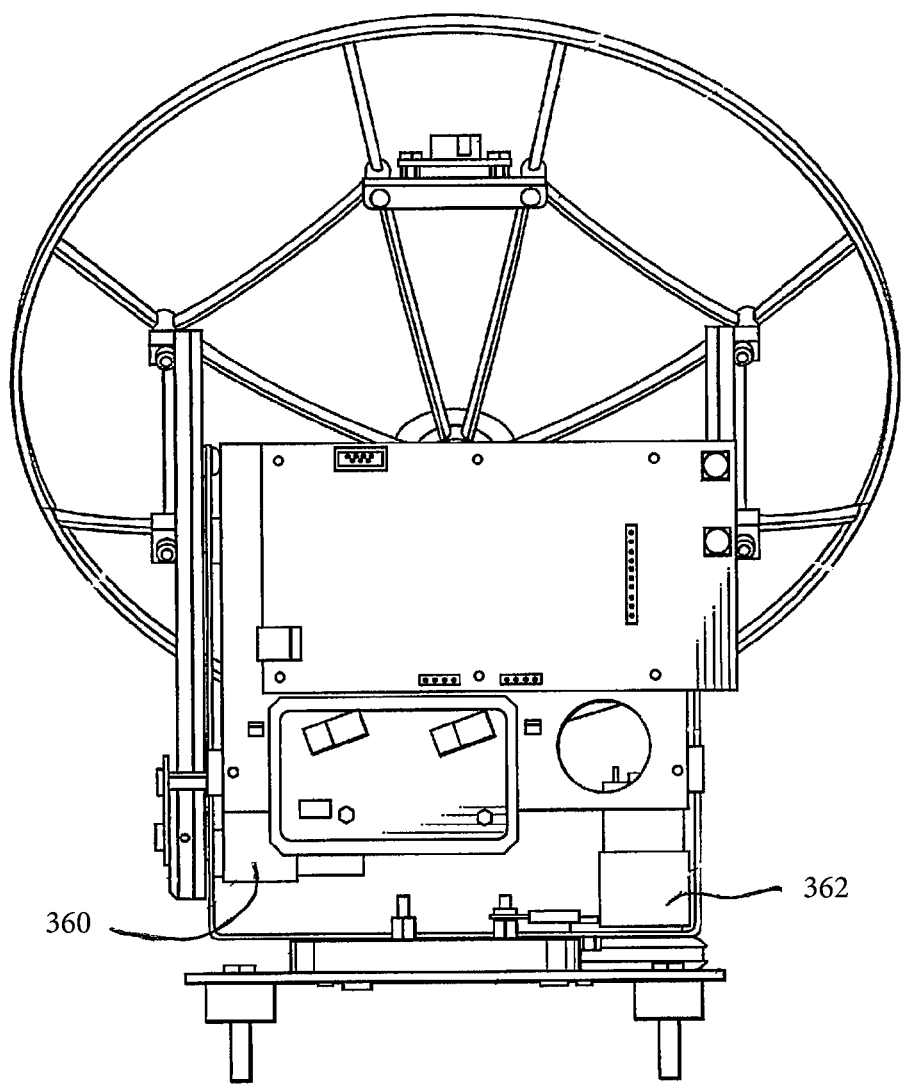
FIG. 15 is a rear perspective view of a portion of a satellite antenna unit according to an example embodiment.

Referring to FIGS. 13-15, certain internal details of the antenna device are shown according to one example embodiment. However, the internal components can have other configurations, shapes and sizes without departing from the scope of the invention. The satellite television antenna system includes a parabolic reflector dish 350 and a subreflector 352 positioned forward of the dish. The dish collects incoming satellite broadcast signals by reflecting them forward to a focal point. The subreflector is located adjacent to the dish's focal point to reflect the collected signal rearward through a feed or guide tube 354 and on to a low noise block (LNB) converter 356 located behind the dish. The LNB converter amplifies the signals and converts them from microwaves to low frequency signals that are transmitted to the enclosure junction 312 and then onward through the communication conduit to the STB. The STB converts and decodes the television signals received through the conduit so they can appear on the screen of a television.

In one embodiment, orientation or positioning of dish 350 is carried out by a motorized elevation drive system, which includes an elevation motor 360, and a motorized azimuth drive system, which includes an azimuth motor 362, that are each controlled by the antenna control system. The antenna control system includes a microprocessor and physical memory disposed on a control board 358, which is located inside of the enclosure. The memory can be either both onboard the processor or separate from the processor, or a combination of both. The memory stores the operating software code for the antenna system, which is executable by the microprocessor. The microprocessor (processor) then communicates with (or selectively energizes) the motors 360 and 362 to selectively orient the dish. The microprocessor also controls communication with the STB.

A GPS receiver can also be provided to the control board 358, or other portion of the antenna unit inside of the enclosure) according to certain embodiments. The GPS receiver in such embodiments communicates with the processor to provide data that the processor uses to determine elevation and/or azimuth orientation data for the dish corresponding to the geographic location of the antenna device.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A satellite television antenna apparatus connectable to a remotely located set top box (STB), the satellite television antenna apparatus comprising:
   an enclosure;
   a reflector dish disposed in the enclosure and movable in at least one of an azimuth orientation and an elevation orientation;

a first motor operably coupled to the dish to move the dish in at least one of the azimuth and elevation orientations;

an antenna control system disposed fully inside of the enclosure, the antenna control system including a physical memory and a microprocessor, the microprocessor coupled to the first motor, wherein the antenna control system is configured to locate a set of at least two Earth orbiting satellite television broadcast locations corresponding to a subscriber's television programming package; lock onto a first satellite location candidate; store a first azimuth position and a first elevation position of the reflector dish corresponding to the first satellite location candidate if the STB indicates to the antenna control system that the first satellite location candidate is a member of the set of at least two Earth orbiting satellite television broadcast locations corresponding to a subscriber's television programming package; lock onto a second satellite location candidate; and store a second azimuth position and a second elevation position of the reflector dish corresponding to the second satellite location candidate if the STB indicates to the antenna control system that the second satellite location candidate is a member of the set of at least two Earth orbiting satellite television broadcast locations corresponding to a subscriber's television programming package.

2. The satellite television antenna apparatus of claim 1, wherein a single coaxial cable connected to both the STB and the satellite television antenna apparatus provides two-way communication, wherein the single coaxial cable carries both command signals from the STB to the antenna apparatus and carries satellite television broadcast signals received by the satellite television antenna apparatus to the STB.

3. The satellite television antenna apparatus of claim 2, wherein the sole source of power for the satellite television antenna apparatus is provided via the single coaxial cable connected to the STB.

4. The satellite television antenna apparatus of claim 1, wherein a sole source of power for the antenna apparatus is provided by the STB, which is transmitted from the STB to the Antenna apparatus via a single cable connection.

5. The satellite television antenna apparatus of claim 1, wherein the antenna control system is further configured to initiate a background microwave radiation scan and set a signal-to-noise ratio prior to locking onto the first satellite location candidate.

6. The satellite television antenna apparatus of claim 1, further comprising a second motor disposed inside of the enclosure, the second motor operably coupled to the dish to move the dish in at least one of the azimuth and elevation orientations.

7. The satellite television antenna apparatus of claim 1, wherein the antenna control system is further configured to directly switch from the first azimuth position to the second azimuth position of the dish without scanning in response to a user changing channels on the STB.

8. The satellite television antenna apparatus of claim 1, wherein the antenna control system is further configured to store an azimuth position and an elevation position of the reflector dish corresponding to a satellite location candidate when the STB indicates to the antenna control system that the satellite location candidate is not a member of the set of at least two Earth-orbiting satellite television broadcast locations corresponding to a subscriber's television programming package.

9. The satellite television antenna apparatus of claim 1, wherein the antenna apparatus is further configured to transmit a coded satellite location identification information to the STB, and wherein the antenna control system is configured to store in memory a corresponding unencoded satellite location identifier provided by the STB.

10. The satellite television antenna apparatus of claim 1, wherein the antenna apparatus is configured as a portable device.

11. A satellite television system comprising a motorized enclosed antenna apparatus, the antenna apparatus configured to receive satellite television signals broadcast from a plurality of satellites located in geosynchronous orbit above the Earth and relay those signals to a remotely-located STB via a communications conduit, the STB configured to decode the audio and video signals received from the antenna apparatus and to send signals back through the same communications conduit to the antenna apparatus, the antenna apparatus comprising:

an enclosure, wherein at least a portion of the enclosure comprises an electromagnetic wave permeable material;

a reflector dish disposed inside of the enclosure, the dish configured to be movable in at least one of an azimuth orientation and an elevation orientation;

a first motor operably engaged with the dish to move the dish in at least one of the azimuth and elevation orientations;

an antenna control system disposed inside of the enclosure, the antenna control system configured to control the first motor to move the dish during a scan of the sky and lock onto a first satellite candidate, receive from the STB a satellite position identification corresponding to the first satellite candidate; store a first azimuth position corresponding to the first satellite candidate whose identification was provided by the STB, lock onto a second satellite candidate, receive from the STB a satellite position identification corresponding to the second satellite candidate; store a second azimuth position corresponding to the second satellite candidate whose identification was provided by the STB, and stop searching for an additional satellite candidate when all satellite positions corresponding to a user's television programming package have been located.

12. The system of claim 11, wherein the antenna apparatus further includes a global positioning system (GPS) receiver coupled to the antenna control system.

13. The system of claim 12, wherein the antenna control system is further configured to determine a particular elevation range of the sky to scan based upon a location of the antenna apparatus determined by the GPS receiver.

14. The system of claim 11, wherein the antenna control system is further configured to initiate a background microwave radiation scan and set a signal-to-noise ratio prior to initiating a scan for the first satellite candidate.

15. The system of claim 11, wherein the antenna apparatus is powered solely by the STB via the communications conduit.

16. The system of claim 11, wherein the antenna control system is further configured to store an azimuth position and an elevation position of the dish corresponding to each satellite candidate whose position identification could not be determined by the STB.

17. The system of claim 11, wherein the antenna control system is further configured to store an azimuth position and an elevation position of the dish corresponding to each satellite candidate whose position identification is determined by the STB, but does not correspond to the user's television programming package.

18. The system of claim 11, wherein the antenna control system is further configured to switch between the first azimuth position and the second azimuth position stored in memory without scanning in response to a user changing channels on the STB.

19. A method of obtaining identification information for television broadcast satellites by a portable motorized satellite antenna device, the method comprising:

connecting the portable motorized satellite antenna device to a STB, the STB being located remote from the portable motorized satellite antenna device;

moving a parabolic reflector dish of the portable motorized satellite antenna device via a motor in at least an azimuth orientation until the portable motorized satellite antenna device is locked onto a first satellite location candidate;

receiving by the portable motorized satellite antenna device from the STB at least one of an identification corresponding to the first satellite location candidate or an indication that the identification cannot be determined;

moving the parabolic reflector dish of the portable motorized satellite antenna device via the motor in at least the azimuth orientation until the portable motorized satellite antenna device is locked onto a second satellite location candidate;

receiving by the portable motorized satellite antenna device from the STB at least one of an identification corresponding to the second satellite location candidate or an indication that the identification cannot be determined;

moving the parabolic reflector dish of the portable motorized satellite antenna device via the motor in at least the azimuth orientation until the portable motorized satellite antenna device is locked onto a further satellite location candidate when not all satellite positions have been located that correspond to the user's television programming package; and ceasing moving the parabolic reflector dish of the portable motorized satellite antenna device via the motor in at least the azimuth orientation until the portable motorized satellite antenna device is locked onto a further satellite location candidate when all satellite positions have been located that correspond to the user's television programming package.

20. The method of claim 19, further comprising:

storing in memory contained in the portable motorized satellite antenna device at least one an azimuth orientation of the dish corresponding to each satellite location candidate that corresponds to the user's television programming package; and moving the parabolic reflector dish of the portable motorized satellite antenna device via the motor in at least the azimuth orientation between two azimuth orientations stored in memory without scanning in response to the user changing channels on the STB.

* * * * *